(12) United States Patent
Gampe et al.

(10) Patent No.: US 10,466,985 B2
(45) Date of Patent: Nov. 5, 2019

(54) HYBRID DEOPTIMIZATION MECHANISM FOR CLASS HIERARCHY ANALYSIS

(71) Applicant: Google LLC, Mountain View, CA (US)

(72) Inventors: Andreas Gampe, Sunnyvale, CA (US); Nicolas Geoffray, London (GB); Mingyao Yang, Cupertino, CA (US)

(73) Assignee: Google LLC, Mountain View, CA (US)

( * ) Notice: Subject to any disclaimer, the term of this patent is extended or adjusted under 35 U.S.C. 154(b) by 176 days.

(21) Appl. No.: 15/407,186

(22) Filed: Jan. 16, 2017

(65) Prior Publication Data

US 2018/0060048 A1  Mar. 1, 2018

Related U.S. Application Data

(60) Provisional application No. 62/378,502, filed on Aug. 23, 2016.

(51) Int. Cl.
*G06F 8/41* (2018.01)
*G06F 9/455* (2018.01)
*G06F 9/448* (2018.01)

(52) U.S. Cl.
CPC .............. *G06F 8/443* (2013.01); *G06F 8/42* (2013.01); *G06F 9/449* (2018.02); *G06F 9/4552* (2013.01); *G06F 9/45525* (2013.01)

(58) Field of Classification Search
CPC . G06F 8/443; G06F 9/449; G06F 8/42; G06F 9/4552; G06F 9/45525
See application file for complete search history.

(56) References Cited

U.S. PATENT DOCUMENTS

| | | | |
|---|---|---|---|
| 6,704,927 B1* | 3/2004 | Bak | G06F 9/44521 717/151 |
| 2003/0115584 A1* | 6/2003 | Fahs | G06F 11/3612 717/158 |

(Continued)

OTHER PUBLICATIONS

Search Report and Written Opinion for PCT/US2017/032572 dated Aug. 7, 2017.

(Continued)

*Primary Examiner* — Wei Y Zhen
*Assistant Examiner* — Amir Soltanzadeh
(74) *Attorney, Agent, or Firm* — McDonnell Boehnen Hulbert Berghoff LLP

(57) ABSTRACT

Apparatus and methods related to compiling software are provided. A computing device can receive software having software-associated instructions for compilation into machine-language instructions. The computing device can perform a class hierarchy analysis to determine a class hierarchy for the software. The computing device can determine whether a particular method call is to be checked for execution as a virtual method call based on the class hierarchy. The computing device can, after determining that the particular method call is to be checked, determine particular machine-language instructions that can include: guarding machine-language instructions for checking a run-time-modifiable deoptimization indicator to determine whether the particular method call is to be executed as a virtual method call, and method-call machine-language instructions for the particular method call. The computing device can provide the particular machine-language instructions to a runtime system.

20 Claims, 12 Drawing Sheets

(56) References Cited

U.S. PATENT DOCUMENTS

| | | | | |
|---|---|---|---|---|
| 2010/0192139 A1* | 7/2010 | Titzer | .................. | G06F 9/485 |
| | | | | 717/151 |
| 2016/0062878 A1* | 3/2016 | Westrelin | .............. | G06F 9/4552 |
| | | | | 717/130 |
| 2016/0314075 A1* | 10/2016 | Moudgill | .............. | G06F 3/0604 |

OTHER PUBLICATIONS

Albert Elvira, et al., "Resource Usage Analysis and its Application to Resource Certification", 2009, Network and Parallel Computing; [Lecture Notes in Computer Science; Lect. Notes Computer], Springer International Publishing, Cham, pp. 258-288.

S. Acharya, "Java Instrumentation with JDK 1.6.X, Class Re-definition after loading", Sep. 14, 2008, available via the Internet at sleeplessinslc.blogspot.com/2008/09/java-instrumentation-with-jdk-16x-class.html (last visited Aug. 3, 2016).

J. Dean et al, "Optimization of Object-Oriented Programs Using Static Class Hierarchy Analysis", Aug. 7, 1995, Proceedings of the 9th European Conference on Object-Oriented Programming (ECOOP '95), pp. 77-101.

H. Hubicka, "Devirtualization in C++, part 1", Jan. 19, 2014, available via the Internet at hubicka.blogspot.com/2014/01/devirtualization-in-c-part-1.html (last visited Aug. 2, 2016).

H. Hubicka, "Devirtualization in C++, part 2", Jan. 26, 2014, available via the Internet at hubicka.blogspot.com/2014/01/devirtualization-in-c-part-2-low-level.html(last visited Aug. 2, 2016).

C. McManis "The basics of Java class loaders", Oct. 1, 1996, JavaWorld, available via the Internet at www.javaworld.com/article/2077260/learn-java/learn-java-the-basics-of-java-class-loaders.html (last visited Aug. 3, 2016).

S. Panda, "Quck Guide to Polymorphism in Java", Jan. 15, 2013, available via the Internet at www.sitepoint.com/quick-guide-to-polymorphism-in-java (last visited Aug. 3, 2016).

A. Sarhan, "Dynamic Class Loading Example", Nov. 8, 2014, available via the Internet at examples.javacodegeeks.com/core-java/dynamic-class-loading-example (last visited Aug. 3, 2016).

Wikimedia Foundation, "Register allocation", May 3, 2016, available via the Internet at en.wikipedia.org/w/index.php?title=Register_allocation&oldid=718380571(last visited Aug. 5, 2016).

* cited by examiner

Source 110

```
class Shape {
  int size = 0;
  void setSize(int s) {
    size = s;
  }
  int getSize() {
    return size;
  }
  void printit() {
    print("It's a shape!");
  }
}
...
class ShapeHolder {
  Shape localShape;
  Shape getShape() {
    return(localShape); }
}
...
main(...){
  ShapeHolder h1;
  ...
  Shape a = h1.getShape();
  a.setSize(4);
  print("The size of a=",
    a.getSize());
}
```

Modified Source 120

```
main(...){
  ShapeHolder h1;
  ...
  Shape a = h1.getShape();
  // guard for setSize()
  if (ShouldDeoptShape) {
    deopt();
  }
  devirtualized call
    a.setSize(4);
  // guard for getSize()
  if (ShouldDeoptShape) {
    deopt();
  }
  tmp = devirtualized call
    a.getSize();
  print("The size of a=",
    tmp);
}
```

Runtime Trace 130

```
Start main
...
Define a as instance
  of class Shape
Allocate register R1 for
  ShouldDeoptShape
Set R1 = 0
a = h1.getShape();
If (R1) - fails
Perform devirtualized
  call a.setSize(4)
If (R1) - fails
Set tmp = devirtualized
  call a.getSize();
Call print(
  "The size of a=", tmp)
Output: The size of a=4
Exit main
```

Computing Device 102

FIG. 1

Source 210

```
// in loadfile file
class Circle extends Shape
{
void printit() {
    print("It's a circle!");
}
...
}
class CircleHolder {
Circle localCircle;
Circle getCircle() {
    return(localCircle); }
...
}
```

Source 212

```
// in mainfile file
class Shape {
void printit() {
    print("It's a shape!");
}
...
}
class ShapeHolder {
Shape localShape;
Shape getShape() {
    return(localShape); }
...
}
main(....){
ShapeHolder h1;
int some_condition;
...
Shape a = h1.getShape();
a.printit();
if (some_condition) {
    CircleHolder h2;
    ...
    Shape c = h2.getCircle();
    c.printit();
    a.printit();
} // end if some_condition
} // end main
```

Modified Source 220

```
main() {
ShapeHolder h1;
int some_condition;
...
Shape a = h1.getShape();
if (ShouldDeoptShape) {
    deopt(); }
devirtualized call
a.printit();
if (some_condition) {
    CircleHolder h2;
    ...
    Shape c = h2.getCircle();
    if (ShouldDeoptCircle) {
        deopt(); }
    devirtualized call
    c.printit();
    if(ShouldDeoptShape) {
        deopt(); }
    devirtualized call
    a.printit();
} // end if some_condition
} // end main
```

Computing Device 102

FIG. 2A

Modified Source 220

```
main() {
  ShapeHolder h1;
  int some_condition;
  ...
  Shape a = h1.getShape();
  if (ShouldDeoptShape) {
    deopt(); }
  devirtualized call
    a.printit();
  if (some_condition) {
    CircleHolder h2;
    ...
    Shape c = h2.getCircle();
    if (ShouldDeoptCircle) {
      deopt(); }
    devirtualized call
      c.printit();
    if(ShouldDeoptShape) {
      deopt(); }
    devirtualized call
      a.printit();
  } // end if some_condition
} // end main
```

Runtime Trace 230

```
Start main
...
Define Shape a
Allocate register R1 for ShouldDeoptShape
Set R1 = 0
a = h1.getShape();
If (R1) - fails
Perform devirtualized call a.printit()
Output: It's a shape!
if (some_condition) - succeeds
Load loadfile to define CircleHolder and Circle
Set R1 = 1
Allocate register R2 for ShouldDeoptCircle
Set R2 = 1
Define CircleHolder h2;
...
Define Shape c;
c = h2.getCircle();
If (R2) - succeeds
  Call deopt() / use interpreter for c.printit();
  Output: It's a circle!
If (R1) - succeeds
  Call deopt() / use interpreter for a.printit();
  Output: It's a shape!
Exit main
```

Computing Device 102

FIG. 2B

```
Source 310
class A {
  int X = 0;
  int Y = 1;
  public int getX()
    { return(X); };
  public int getY()
    { return(Y); };
...}
class AHolder {
  A localA;
  public A getA() {
    return(localA); };
...}
void printXY(A in) {
  print("X=",in.getX(),
    "Y=",in.getY());
}
main(...) {
  AHolder h1;
  ...
  A receiver = h1.getA();
  printXY(receiver);
}
```

```
Modified Source 320
void printXY(A in) {
  // guard for getX()
  if (ShouldDeoptA) {
    deopt();
  }
  tmp1 = devirtualized call
    in.getX();
  // guard for getY()
  if (ShouldDeoptA) {
    deopt();
  }
  tmp2 = devirtualized call
    in.getY();
  print("X=",tmp1,"Y=",
    tmp2);
}
main(...) {
  AHolder h1;
  ...
  A receiver = h1.getA();
  // guard for parameter
  if (ShouldDeoptA) {
    deopt();
  }
  printXY(receiver);
}
```

```
Optimized Source 330
void printXY(A in) {
  // guard for getX() removed
  tmp1 = devirtualized call
    in.getX();
  // guard for getY() removed
  tmp2 = devirtualized call
    in.getY();
  print("X=",tmp1,"Y=",
    tmp2);
}
main(...) {
  AHolder h1;
  ...
  A receiver = h1.getA();
  // guard for parameter
  if (ShouldDeoptA) {
    deopt();
  }
  printXY(receiver);
}
```

Computing Device 102

Source 510:
```
class A {
  int X = 0;
  int Y = 1;
  public void setX(int inX)
  { X = inX; };
  public void setY(int inY)
  { Y = inY; };
  public int getX()
  { return(X); };
  public int getY()
  { return(Y); };
...}
class AHolder {
  A localA;
  public A getA() {
    return(localA); };
};
...
main(...) {
  AHolder h1;
  ...
  A receiver = h1.getA();
  int i;
  for (i = 0; i < 10; i++) {
    receiver.setX(i*4);
    print("X=",
      receiver.getX());
  } // end for loop
} // end main
```

Modified Source 520:
```
main(...){
  Aholder h1;
  ...
  A receiver = h1.getA();
  int i;
  for (i = 0; i < 10; i++) {
    // guard for setX()
    if (ShouldDeoptA) {
      deopt();
    }
    tmp1 = i * 4;
    devirtualized call
      receiver.setX(tmp1);
    // guard for getX()
    if (ShouldDeoptA) {
      deopt();
    }
    tmp1 = devirtualized call
      receiver.getX();
    print("X=", tmp1);
  } // end for loop
} // end main
```

Optimized Source 530:
```
main(...){
  Aholder h1;
  ...
  A receiver = h1.getA();
  int i;
  // guard moved out of loop
  if (ShouldDeoptA) {
    deopt();
  }
  for (i = 0; i < 10; i++) {
    // guard for setX removed
    tmp1 = i * 4;
    devirtualized call
      receiver.setX(tmp1);
    // guard for getX removed
    tmp1 = devirtualized call
      receiver.getX();
    print("X=", tmp1);
  } // end for loop
} // end main
```

Computing Device 102

Source 610

```
class A {
int X = 0;
public void setX(int inX) { X = inX; };
public int getX() { return(X); }; ...}
class B {
int Y = 0;
public void setY(int inY) { Y = inY; };
public int getY() { return(Y); }; ...}
class AHolder {
A localA;
public A getA() { return(localA); };
...}
class BHolder {
B localB;
public B getB() { return(localB); };
...}
main(...) {
Aholder hA;
Bholder hB;
int x, y;
...
A receiverA = hA.getA();
B receiverB = hB.getB();
receiverA.setX(x);
receiverB.setY(y);
print("X * Y =",receiverA.getX() *
receiverB.getY());
} // end main
```

Modified Source 620

```
main(...) {
Aholder hA;
Bholder hB;
int x, y;
...
A receiverA = hA.getA();
B receiverB = hB.getB();
// guard for setX()
if (ShouldDeoptA) { deopt(); }
devirtualized call receiverA.setX(x);
// guard for setY()
if (ShouldDeoptB) { deopt(); }
devirtualized call receiverB.setY(y);
// guard for getX()
if (ShouldDeoptA) { deopt(); }
tmp1 = devirtualized call
        receiverA.getX();
// guard for getY()
if (ShouldDeoptB) { deopt(); }
tmp2 = devirtualized call
        receiverB.getY();
tmp2 = tmp2 * tmp1;
print("X * Y =",tmp2);
} // end main
```

Computing Device 102

FIG. 6A

```
Optimized Source 622
main(...){
  Aholder hA;
  Bholder hB;
  int x, y;
  ...
  A receiverA = hA.getA();
  B receiverB = hB.getB();
  // guard for setX()
  if (ShouldDeoptALL) { deopt(); }
  devirtualized call receiverA.setX(x);
  // guard for setY()
  if (ShouldDeoptALL) { deopt(); }
  devirtualized call receiverB.setY(y);
  // guard for getX()
  if (ShouldDeoptALL) { deopt(); }
  tmp1 = devirtualized call
     receiverA.getX();
  // guard for getY()
  if (ShouldDeoptALL) { deopt(); }
  tmp2 = devirtualized call
     receiverB.getY();
  tmp2 = tmp2 * tmp1;
  print("X * Y =",tmp2);
} // end main
```

```
Optimized Source 630
main(...){
  Aholder hA;
  Bholder hB;
  ...
  A receiver = hA.getA();
  B receiver = hB.getB();
  // guard for setX()
  if (ShouldDeoptALL) { deopt(); }
  devirtualized call receiverA.setX(4);
  // guard for setY() removed
  devirtualized call receiverB.setX(6);
  // guard for getX() removed
  tmp1 = devirtualized call receiverA.getX();
  // guard for getY() removed
  tmp2 = devirtualized call receiverB.getY();
  tmp2 = tmp2 * tmp1;
  print("X * Y =",tmp2);
} // end main
```

Computing Device 102

FIG. 6B

Source 710

```
class A {
int X = 0;
public void setX(int inX)
{ X = inX; };
public int getX()
{ return(X); };
...}
class AHolder {
A localA;
public A getA() {
return(localA); };
...}
main(...) {
AHolder h1, h2;
int i;
...
A receiver1 = h1.getA();
A receiver2 = h2.getA();
...
// begin NS portion P1
i = 111;
receiver1.setX(i);
i = 222;
receiver2.setX(i);
...
// end NS portion P1
...
} // end main
```

Modified Source 720

```
main(...) {
AHolder h1, h2;
int i;
...
A receiver1 = h1.getA();
A receiver2 = h2.getA();
...
// begin NS portion P1
i = 111;
// L1: guard for 1st setX()
L1: if (ShouldDeoptA) {
        deopt();
     }
// L2: devirtualized call
     receiver1.setX(i);
i = 222;
// L3: guard for 2nd setX()
L2: if (ShouldDeoptA) {
        deopt();
     }
devirtualized call
     receiver2.setX(i);
...
// end NS portion P1
...
} // end main
```

Optimized Source 730

```
main(...) {
AHolder h1, h2;
int i;
...
A receiver1 = h1.getA();
A receiver2 = h2.getA();
...
// begin NS portion P1
i = 111;
// L1: guard for 1st setX()
if (ShouldDeoptA) {
    deopt();
}
// L2: devirtualized call
    receiver1.setX(i);
i = 222;
// since no thread susp.
// between L2 and L3,
// can delete guard at L3
devirtualized call
    receiver2.setX(i);
...
// end NS portion P1
...
} // end main
```

FIG. 7

HYBRID DEOPTIMIZATION MECHANISM FOR CLASS HIERARCHY ANALYSIS

CROSS-REFERENCE TO RELATED APPLICATIONS

This application claims priority to U.S. Patent App. No. 62/378,502, entitled "Hybrid Deoptimization Mechanism for Class Hierarchy Analysis", flied Aug. 23, 2016, the contents of which are fully incorporated by reference herein for all purposes.

BACKGROUND

In a runtime environment that uses a virtual machine, such as one that supports the Java language, software can be converted into one or more bytecodes. A bytecode is an instruction that performs one or more relatively low-level operations; e.g., memory loads and stores, register operations, and basic numerical operations. However, a bytecode may not be directly executable on a particular computing device. In contrast, a machine-language instruction for a particular computing device can be directly executed by the particular computing device to perform one or more relatively low-level operations.

To bridge the gap between bytecodes and machine-language instructions, bytecodes can be compiled, which involves converting the bytecodes into machine-language instructions that can be executed on the particular computing device. Another technique for executing bytecodes involves use of an interpreter, or software executable on the particular computing device that can perform operations as specified by the bytecodes. Typically, bytecodes that have been compiled into machine-language instructions can be executed faster than interpreted bytecodes.

Some bytecode compilers can operate as ahead-of-time (AOT) compilers, which compile all of the bytecodes into machine-language instructions in prior to execution of the machine-language instructions; i.e., all machine-language instructions are generated prior to runtime. Some bytecode compilers can operate as a just-in-time (JIT) compiler that compiles bytecodes into machine-language instructions as needed during execution of the software.

SUMMARY

In one aspect, a method is provided. A computing device receives software expressed using one or more software-associated instructions to be compiled into machine-language instructions. The software includes a particular method call. The computing device performs a class hierarchy analysis of the software to determine a class hierarchy associated with the software. The computing device determines whether the particular method call is to be checked for execution as a virtual method call based on the class hierarchy. After determining that the particular method call to be checked for execution as a virtual method call, the computing device determines one or more particular machine-language instructions. The one or more particular machine-language instructions include: one or more guarding machine-language instructions for performing a check of a deoptimization indicator to determine whether the particular method call is to be executed as a virtual method call, where the deoptimization indicator is modifiable at runtime; and one or more method-call machine-language instructions for the particular method call. The computing device provides the one or more particular machine-language instructions to a runtime system of the computing device.

In another aspect, a computing device is provided. The computing device includes one or more processors; and data storage including at least computer-executable instructions stored thereon that, when executed by the one or more processors, cause the computing device to perform functions. The functions include: receiving software expressed using one or more software-associated instructions to be compiled into machine-language instructions, where the software includes a particular method call; performing a class hierarchy analysis of the software to determine a class hierarchy associated with the software; determining whether the particular method call is to be checked for execution as a virtual method call based on the class hierarchy; after determining that the particular method call is to be checked for execution as a virtual method call, determining one or more particular machine-language instructions including: one or more guarding machine-language instructions for performing a check of a deoptimization indicator to determine whether the particular method call is to be executed as a virtual method call, where the deoptimization indicator is modifiable at runtime; and one or more method-call machine-language instructions for the particular method call; and providing the one or more particular machine-language instructions to a runtime system.

In another aspect, a non-transitory computer readable medium is provided. The non-transitory computer readable medium has stored thereon instructions, that when executed by one or more processors of a computing device, cause the computing device to perform functions. The functions include: receiving software expressed using one or more software-associated instructions to be compiled into machine-language instructions, where the software includes a particular method call; performing a class hierarchy analysis of the software to determine a class hierarchy associated with the software; determining whether the particular method call is to be checked for execution as a virtual method call based on the class hierarchy; after determining that the particular method call is to be checked for execution as a virtual method call, determining one or more particular machine-language instructions including: one or more guarding machine-language instructions for performing a check of a deoptimization indicator to determine whether the particular method call is to be executed as a virtual method call, where the deoptimization indicator is modifiable at runtime; and one or more method-call machine-language instructions for the particular method call; and providing the one or more particular machine-language instructions to a runtime system.

In another aspect, an apparatus is provided. The apparatus includes: means for receiving software expressed using one or more software-associated instructions to be compiled into machine-language instructions, where the software includes a particular method call; means for performing a class hierarchy analysis of the software to determine a class hierarchy associated with the software; means for determining whether the particular method call is to be checked for execution as a virtual method call based on the class hierarchy; means for, after determining that the particular method call is to be checked for execution as a virtual method call, determining one or more particular machine-language instructions including: one or more guarding machine-language instructions for performing a check of a deoptimization indicator to determine whether the particular method call is to be executed as a virtual method call, where the deoptimization indicator is modifiable at runtime; and one or more method-call machine-language instructions for the particular method call; and means for providing the one or more particular machine-language instructions to means for runtime execution.

In another aspect, a system is provided: The system includes a first computing device and a second computing device. The first computing device includes one or more first processors and first data storage including at least computer-executable instructions stored thereon that, when executed by the one or more first processors, cause the first computing device to perform first functions. The first functions include: sending first software expressed using one or more software-associated instructions. The second computing device includes one or more second processors and second data storage including at least computer-executable instructions stored thereon that, when executed by the one or more second processors, cause the second computing device to perform second functions. The second functions include: receiving software expressed using one or more software-associated instructions to be compiled into machine-language instructions that includes the first software, where the software includes a particular method call; performing a class hierarchy analysis of the software to determine a class hierarchy associated with the software; determining whether the particular method call is to be checked for execution as a virtual method call based on the class hierarchy; after determining that the particular method call is to be checked for execution as a virtual method call, determining one or more particular machine-language instructions including: one or more guarding machine-language instructions for performing a check of a deoptimization indicator to determine whether the particular method call is to be executed as a virtual method call, where the deoptimization indicator is modifiable at runtime; and one or more method-call machine-language instructions for the particular method call; and providing the one or more particular machine-language instructions to a runtime system.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

BRIEF DESCRIPTION OF THE FIGURES

FIG. 1 shows a scenario involving runtime execution of software for hybrid synchronous/asynchronous deoptimization by a computing device, in accordance with an example embodiment.

FIGS. 2A and 2B show a scenario involving runtime execution of software for hybrid synchronous/asynchronous deoptimization and class loading by a computing device, in accordance with an example embodiment.

FIG. 3 illustrates a scenario where a computing device generates optimized source software associated with hybrid synchronous/asynchronous deoptimization, in accordance with an example embodiment.

FIG. 5 illustrates a yet another scenario where a computing device generates optimized source software associated with hybrid synchronous/asynchronous deoptimization, in accordance with an example embodiment.

FIGS. 6A and 6B illustrate even another scenario where a computing device generates optimized source software associated with hybrid synchronous/asynchronous deoptimization, in accordance with an example embodiment.

FIG. 7 illustrates still another scenario where a computing device generates optimized source software associated with hybrid synchronous/asynchronous deoptimization, in accordance with an example embodiment.

DETAILED DESCRIPTION

Figure 4:
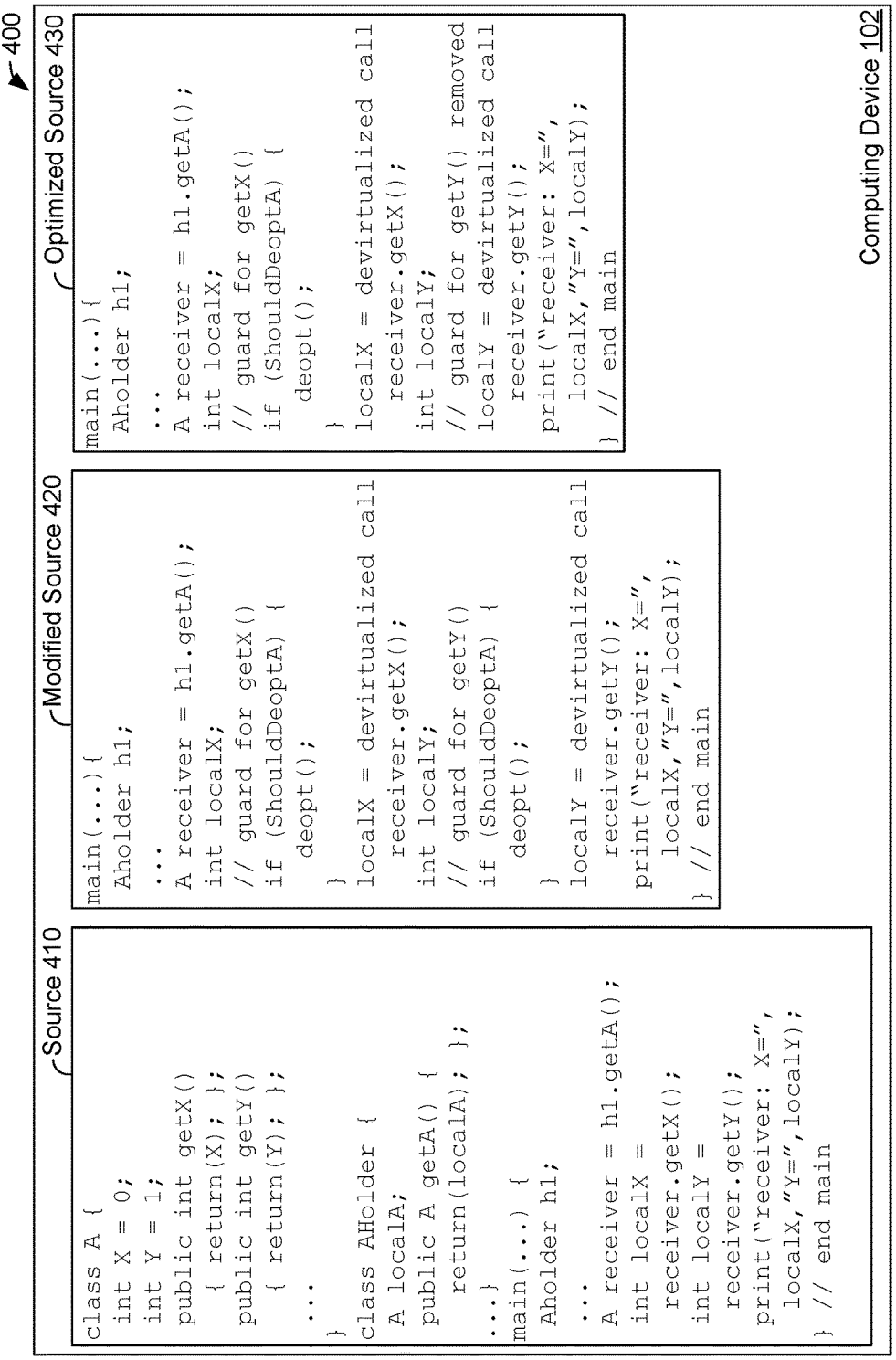
FIG. 4 illustrates another scenario where a computing device generates optimized source software associated with hybrid synchronous/asynchronous deoptimization, in accordance with an example embodiment.

Techniques for Selectively Deoptimizing Methods at Runtime

During execution of object-oriented software represented as bytecodes by a virtual runtime system, a computing device can switch between execution of machine-language instructions generated from bytecodes; e.g., machine-language instructions generated by a Just-In-Time (JIT) compiler, and interpreted execution of bytecodes. One case where execution can be switched between compiled execution and interpreted execution is during debugging. Some debugger operations, such as single-step execution of software, are handled by the interpreter. Once a debugger is invoked, bytecodes that may have previously been compiled are often interpreted, as software examined by the debugger is typically executed by the interpreter. If the software being debugged involves a series of prior method calls, data for these method calls can be stored in an execution stack.

When execution is switched from compiled code, i.e., machine-language instructions generated from bytecodes, to interpreted code, i.e., bytecodes executed using the interpreter, the resulting execution can be classified as deoptimized execution, as typically more efficient execution of compiled code by the computing device is switched to typically less efficient execution of interpreted code by an interpreter, and so any optimization achieved by generating machine-language instructions is lost by switching to the interpreter.

A deoptimization technique can be invoked to ensure that software to be interpreted is in an interpreter state equivalent to a compiled code state that the software was in while executing compiled machine-language instructions. In particular, the deoptimization technique can modify an execution stack to convert data stored in the execution stack while executing machine-language instructions to be suitable for interpreter execution. The deoptimization technique can record an interpreter state together with a compiled code state at one or more program points where switching to the interpreter can occur. When the deoptimization technique is utilized at runtime, the deoptimization technique can use the recorded interpreter states to translate compiled code states into corresponding interpreter states and then invoke the interpreter. In some embodiments, an external thread, such as a debugging thread, can force deoptimization in another thread by: changing an entry point for compiled code to an interpreter bridge, suspending all threads associated with the compiled code, and examining execution stacks of the now-suspended threads. If an execution stack includes a reference to a particular method to be deoptimized, the external thread can change a return program counter address for the particular method's callee (e.g., another method that called the particular method) so that the callee invokes a deoptimization technique.

Deoptimization can be performed synchronously or asynchronously. Asynchronous deoptimization is performed when a thread (or process) outside of the thread (or process) executing software determines to invoke a deoptimization technique for the thread (or process) executing software. That is, asynchronous deoptimization is forced on a thread (or process) executing compiled code, often from another thread; e.g., a debugger thread.

Synchronous deoptimization is performed when compiled code of an executing thread (or process) determines to invoke a deoptimization technique. Frequently, compiled code can explicitly test for one or more conditions related to deoptimization. If those condition(s) exist, the compiled code can explicitly call software implementing a synchronous deoptimization technique. For example, synchronous deoptimization software can be inserted by a compiler. The compiler can insert software for a call to a deoptimization technique for a portion of software that is not readily optimizable by the compiler. Then, the compiler can deoptimize the portion of software for handling by the interpreter so that the compiler can better optimize remaining software. In this example, synchronous optimization can be performed by changing an entry point for the compiled code to an interpreter bridge. In some examples, the deoptimized portion of software can later be recompiled with different and more up-to-date assumptions. Other examples of synchronous and asynchronous deoptimization are possible as well.

Object-oriented software, such as software written in Java, C++, Python, or Ruby, frequently includes one or more software objects that include one or more methods, or functions that perform operations associated with the object. For example, an object representing a shape might have a method that indicates a type of shape of the object; e.g., a circle, rectangle, etc. Software objects are often specified an instance of a class, where the class can specify data and methods for the object. The class can include sub-classes; for example, a class defining a shape object can have a subclass defining triangle objects.

Some methods are interface methods, which are methods that implement an explicitly defined interface that can be common across many classes. If a method is an interface method, the method can be a direct method or a virtual method. As used herein, a direct method is a method that is not part of an interface and only has one implementation, while a virtual method is a method that is part of an interface and has multiple implementations. For example, a method specified by a base class, or a class that has subclasses, can be implemented by the base class and one or more of its subclasses, and so is a virtual method. As another example, a method implemented by only one class is a direct method.

Many object-oriented programs have virtual method calls. The following is an example of a Java method call:
 receiver.getX( )
The "getX( )" portion of the line above can be a call to a method named "getX". The getX( ) method can be a virtual method, and so could have different implementations, depending on a type of the "receiver" object.

To invoke or execute a method of a class, a runtime system can examine a class hierarchy associated with an object to determine which specific method to execute. For example, suppose a shape class has two subclasses: a triangle subclass and a polygon subclass. In this example, the shape class can define a "Type" method that is implemented separately by each of the shape class and the triangle subclass, but is not implemented by the polygon subclass. If the Type method is called for an instance of the polygon subclass, the class hierarchy for the polygon subclass can indicate that there is no implementation for the Type method at the polygon level, but an implementation for the Type method exists at the shape level (i.e., as the shape class is a base class to the polygon class). Then, the Type method at the shape level can be executed for the polygon instance. However, if the Type method were called for an instance of the triangle subclass, the class hierarchy can be examined to determine that the implementation of the Type method at the triangle level can be invoked for the triangle instance.

To implement a method call, the runtime system can first dispatch, or select, a method for execution, and then call, or execute, the dispatched method. The specification of virtual/interface method calls can involve use of complicated method resolution rules often involving iterating through a method list and traversing a corresponding class hierarchy.

To reduce reliance on the method resolution rules and to speed method dispatch, the runtime system can use, on a per-class basis, interface method tables for interface methods and/or virtual method tables ("vtables" for short) for virtual methods. A vtable is a variable length table (or similar data structure) of table entries, with each table entry including an identifier for a virtual method and a reference to the corresponding virtual method, such as a memory address related to the virtual method. Similarly, each table entry in an interface method table includes an identifier for an interface method and a reference to the corresponding interface method. In some examples, vtables can include table entries for both virtual and direct methods.

The vtable and/or the interface table can store information indicating which implementation of a method to be used for a particular class instance. If the vtable is used for a method call, then such a method call is as a virtual call or virtual method call. For example, selecting a particular vtable entry for the method call can select between multiple implementations of the method and the particular vtable entry can store a reference, such as an entry point, for a particular implementation. However, if use of the vtable is avoided for a non-interface method call, the method call can be termed a direct call or direct method call. For example, use of the vtable can be avoided for some method calls when there is only one implementation of the method—then the entry point of the method can be determined as a memory address storing the one implementation. In some examples, direct calls can involve avoiding use of interface tables for calling interface methods; then, the direct call can be specifically termed a direct interface call or direct interface method call.

An example sequence for a virtual method call using a vtable follows:
 compiled_code=receiver.getClass( ).getVTableSlot (some_index).getCompiledCode( );
 invoke compiled_code;
In the first line above, a "getCompiledCode( )" method is invoked to obtain compiled code stored at a reference saved in a vtable. The vtable is obtained using the "getVTableSlot" method for a class specified by the "getClass" method of a "receiver" object. The specific compiled code obtained is based on an index "some_index" that refers to a method being invoked by the virtual method call. That is, the first line of the example sequence returns compiled code for the method being invoked. Then, the second line of the example sequence above invokes the compiled code.

The overhead for invoking a virtual method can be relatively high compared to invoking a direct method. As indicated by the example sequence above, a vtable-based virtual method call can involve two or more dependent memory load operations to obtain the compiled code being invoked. Dependent memory loads can be costly, particularly on modern CPU architectures.

Devirtualizing virtual methods can speed software execution. Devirtualization of a particular method can include making a direct method call rather than a virtual method call for particular method. In some cases, direct method calls can be implemented using "inlining" or replacing the particular method call with a copy of software implementation of the method. However, a vtable-based virtual call typically cannot be devirtualized when multiple implementations of the method can exist.

Using Class Hierarchy Analysis for Devirtualizing Methods

One technique for determining whether a method can be devirtualized uses class hierarchy analysis (CHA). Class hierarchy analysis involves supplying a compiler with information about a program's class hierarchy, or set of inheritance relationships, and a set of methods defined for each class in the class hierarchy. Based on the information provided by the class hierarchy analysis, the compiler can determine whether or not a virtual method call is eligible for devirtualization.

For example, a class hierarchy analysis can determine whether a virtual method call is actually a direct call. For example, suppose a receiver object is an instance of a class Foo that is not subclassed. The class hierarchy analysis and resulting class hierarchy can indicate that all virtual method calls made using the receiver object are direct calls. As another example, suppose a virtual method call is written as "receiver.getX( )", where "receiver" is an instance of a class Foo that has been subclassed, but no subclass of Foo implements the "getX( )" method. Then, the class hierarchy analysis and resulting class hierarchy can indicate that receiver.getX( ) is a direct call to the implementation of method getX( ) in class Foo. After determining that a virtual method call is actually a direct call, the virtual method call can be devirtualized to become a direct call.

The class hierarchy analysis can be statically performed by examining all classes in software that may be compiled and determining which virtual calls are actually direct calls. Some static class hierarchy analyses can be incorrect; since some software may be unavailable at a time the static class hierarchy analysis is performed. Software unavailability may be due to dynamic class loading, which involves adding one or more software classes for execution during runtime. A dynamically loaded class may not be part of a static class hierarchy analysis, and so the static class hierarchy analysis may miss the dynamically loaded class.

In some embodiments, the class hierarchy analysis can be performed dynamically at runtime to determine a dynamic class hierarchy analysis representing all classes loaded into the runtime system. The dynamic class hierarchy analysis can be updated when new classes are loaded. In some embodiments, both static and dynamic class hierarchy analyses are used. For example, a static class hierarchy analysis of software can be initially performed, perhaps during a compilation step where the software is compiled into bytecodes (or equivalents thereof). Then, a dynamic class hierarchy analysis can be performed one or more times during execution of the software to update the initial static class hierarchy analysis.

Techniques for Correctly Devirtualizing Methods Using Runtime Deoptimization

In some examples, the class hierarchy analysis can make assumptions in determining whether or not to devirtualize a virtual call. In some examples, these assumptions can be either too conservative or too aggressive. If the assumptions are too aggressive, resulting software execution may be incorrect; e.g., the wrong implementation of a devirtualized method can be executed. If those assumptions are too conservative, runtime performance can suffer by executing more virtual calls than necessary.

Some assumptions made by class hierarchy analysis are violated at runtime. For example, class hierarchy analysis can take advantage of the runtime profile of loaded classes to devirtualize virtual calls, as long as a method only has one implementation (i.e., the method is not overridden by subclasses). However if the assumption that a method has only one implementation is violated at runtime, e.g., due to class loading, compiled code for the method generated based on that assumption may be invalid, and so a method call of the invalidated method may have to be executed by the interpreter.

One technique for correcting assumptions made in devirtualizing method calls uses asynchronous deoptimization. In this technique, asynchronous deoptimization can: (1) patch a callee's return program counter to remove compiled method stack frames/activation records from an execution stack, (2) replace the removed stack frames/activation records with corresponding interpreter frames, and (3) start interpreter execution using the interpreter frames.

However, using asynchronous deoptimization to correct assumptions made in devirtualizing method calls may have drawbacks. In many examples, asynchronous deoptimization can be triggered at a thread suspension point, causing thread suspension points to be deoptimization points, leading to additional overhead for suspending threads due to maintaining information mapping from compiled code states to interpreter states at thread suspension points. Another drawback is that some values that should be indicated as dead (or unused) in compiled code can be indicated as kept alive (or used) at deoptimization points. Keeping alive unnecessarily marked values can use more registers than necessary and/or generate unnecessary movements of data from registers to memory (i.e., unnecessary register spills). Also, each deoptimization point can prevent some types of code motion.

Another drawback to using asynchronous deoptimization can involve the complexity of runtime deoptimization software that sets up an execution stack for interpreter usage by examining the stack and patching return program counter values for the interpreter. The runtime deoptimization software has to operate at program points that are otherwise unexpected to be deoptimized, such as loop back-edges and compiled slow paths that call into runtime. To operate at such program points, the runtime deoptimization software can manage a mapping of patched return program counters and real return program counters for correctly updating the stack. Managing the mapping can add complexity to the runtime deoptimization software. Asynchronous deoptimization can be particularly complex in situations where the interpreter should re-execute a partially executed bytecode; e.g., when the bytecode involves use of runtime calls. Further, supporting asynchronous deoptimization can increase complexities in other runtime software, such as exception handling software and/or other software that patches return program counters; e.g, method tracing software.

Another technique for correcting assumptions made in devirtualizing method calls can depend on synchronous deoptimization. The synchronous deoptimization technique can include insertion and use of one or more "guards" or explicit checks to determine whether compiled code is valid or invalid. If a guard indicates compiled code for a method is invalid, assumptions made in devirtualizing method calls can be corrected by deoptimization. If the guard indicates compiled code for the method is valid, assumptions made in devirtualizing method calls can be maintained. Example pseudo-code for a guard is shown in Table 1 below.

TABLE 1

```
// guard for validity of assumptions to devirtualize
if (current compiled code is not valid) {
    deoptimize; // invalid, so correct the assumptions.
    // Deoptimization can involve setting up a call stack for
    // interpreter execution and calling the interpreter.
}
do devirtualized virtual call; // if here, assumptions valid
```

A flag variable, which can be a Boolean variable or other data, can be tested to determine whether currently executed compiled code is still valid. Typically, a value of the flag variable is set in a header of the compiled code. However, changing a flag during runtime that was set in a header of compiled code may not be possible, since the header of the compiled code can be stored in a read-only code section of memory. Further, there is some expense—at least one memory load—to get the flag for testing validity.

Herein is described a hybrid approach for correcting assumptions made in devirtualizing method calls that utilizes aspects of both synchronous and asynchronous deoptimization. For each compiled method that does devirtualized virtual calls, a runtime-modifiable deoptimization indicator (i.e., stored in a read-write section of memory) can be defined for the method. In the examples herein, the deoptimization indicator is represented by a "should_deoptimize" variable.

The compiled code can execute a guard at runtime for each devirtualized virtual call. Example pseudo-code for such a guard is shown in Table 2 below.

TABLE 2

```
// runtime guard for validity of assumptions to devirtualize
if (should_deoptimize) {
    deoptimize; // invalid, so correct the assumptions
    // deoptimization can involve setting up a call stack for
    // interpreter execution and calling the interpreter.
}
do devirtualized virtual call; // if here, assumptions valid
```

The explicit check of the deoptimization indicator/should_deoptimize variable made by the guard shown in Table 2 above is an aspect of synchronous deoptimization, while runtime aspects of the deoptimize functionality shown in Table 2 are aspects of asynchronous deoptimization. In some embodiments, the guard and the runtime aspects of the deoptimize functionality can be both simple and efficient.

For each method utilized, a value of a respective should_deoptimize variable can be initialized to value of 0, representing an initial assumption allowing optimization/devirtualization for a method (i.e., an assumption the method is eligible for optimization/devirtualization). During runtime, the value of the should_deoptimize variable can be modified. For example, a value of a should_deoptimize variable for a method can be set to a value of 1 (or another non-zero value) to indicate an assumption denying optimization/devirtualization for the method (i.e., an assumption the method is ineligible for optimization/devirtualization). Then, a test of the value of the should_deoptimize variable for the method can guard the devirtualized virtual call for the method.

By using a hybrid synchronous/asynchronous deoptimization technique that makes explicit tests for deoptimization conditions, a compiler can control program points where deoptimization occurs. Controlling deoptimization points can reduce the amount of metadata associated with the compiled code, free up registers for dead values, allow more code motion, and simplify deoptimization at runtime, enabling the compiled code to execute more efficiently and reducing overhead associated with compilation. By allocating a register to store a deoptimization indicator and optimizing guards using the herein-described optimization techniques, the cost for using hybrid deoptimization can be minimized. The herein-described hybrid deoptimization technique can be used in other scenarios where a compiler makes aggressive assumptions and later uses deoptimization to correct those aggressive assumptions at runtime.

Example Scenarios for Selectively Deoptimizing Methods at Runtime

FIG. 1 shows scenario 100 involving runtime execution of software for hybrid synchronous/asynchronous deoptimization by computing device 102, in accordance with an example embodiment. During scenario 100, computing device 102 executes a JIT compiler to generate machine-language instructions from bytecodes corresponding to source 110. In other scenarios, a compiler other than a JIT compiler can be used.

Then, the JIT compiler modifies the bytecodes corresponding to source 110 and/or adds bytecodes to generate modified bytecodes represented as modified source 120. The JIT compiler generates machine-language instructions from the modified bytecodes. In other scenarios, the JIT compiler can output additional and/or modified machine-language instructions that correspond to modifying source 110 into modified source 120, rather than modifying and/or adding bytecodes.

After the JIT compiler generates at least some of the machine-language instructions representing modified source 120, computing device 102 uses runtime system software, which includes a bytecode interpreter for executing bytecodes, to execute bytecodes and/or machine-language instructions. In particular, computing device 102 executes the bytecodes and/or machine-language instructions representing modified source 120 and generates information about the executed software shown as runtime trace 130 in FIG. 1 during scenario 100. After computing device 102 uses the runtime system software to execute the bytecodes and/or machine-language instructions corresponding to modified source 120 and generates runtime trace 130, scenario 100 can end.

Tables 3A, 3B, and 3C respectively reproduce herein reformatted contents of source 110, modified source 120, and runtime trace 130 shown in FIG. 1.

TABLE 3A

```
class Shape {
    int size = 0;
    void setSize(int s) {
        size = s;
    }
    int getSize( ) {
```

TABLE 3A-continued

```
        return size;
    }
    void printit( ) {
        print("It's a shape!");
    }
}
class ShapeHolder {
    class Shape localShape;
    class Shape getShape( ) { return(localShape); };
    ...
}
main(...) {
    ShapeHolder h1;
    ...
    Shape a = h1.getShape( );
    a.setSize(4);
    print("The size of a=",a.getSize( ));
}
```

TABLE 3B

```
main(...){
    ShapeHolder h1;
    ...
    Shape a = h1.getShape( );
    // guard for setSize( )
    if (ShouldDeoptShape) {
        deopt( );
    }
    devirtualized call a.setSize(4);
    // guard for getSize( )
    if (ShouldDeoptShape) {
        deopt( );
    }
    tmp = devirtualized call a.getSize( );
    print("The size of a=",tmp);
}
```

TABLE 3C

```
Start main
    ...
    Define a as instance of class Shape
    Allocate register R1 for ShouldDeoptShape
    Set R1 = 0
    a = h1.getShape( );
    If (R1) - fails
    Perform devirtualized call a.setSize(4)
    If (R1) - fails
    Set tmp = devirtualized call a.getSize( );
    Call print("The size of a=", tmp)
    Output: The size of a=4
Exit main
```

As shown in FIG. 1 and Table 3A, source 110 includes a definition of a "class Shape" that includes at least one integer—"size"—and at least three methods: "setSize (int s)", which sets a value of the size integer to a value of an input parameter s; "getSize( )", which returns the value of the size integer; and "printit( )", which prints a message "It's a shape!". Source 110 also includes definition of a "class ShapeHolder" that includes at least an object of class Shape in a "localShape" variable, where the localShape variable can be obtained using the "getShape( )" method of the ShapeHolder class.

In scenario 100, the call to the "getShape( )" method in the line "Shape a=h1.getShape( )" leads to class hierarchy analysis for devirtualizing method calls made using the "a" object variable, as the getShape( ) method could be returning either an object of class Shape or an object of a subclass of class Shape. A class hierarchy analysis can determine the actual type of the "a" object of source 110, corresponding method implementations, and possible devirtualization of method calls. Source 110 shows calls to each of methods setSize and getSize of class Shape using the "a" object—these method calls can be checked for execution as virtual method calls using deoptimization indicators. In some embodiments, a method call executed as a virtual method call can be executed by the bytecode interpreter of the runtime system of computing device 102.

FIG. 1 and Table 3B show modified source 120 as source 110 after being updated for performing a hybrid synchronous/asynchronous deoptimization technique. Modified source 120 illustrates modifications made by the JIT compiler to source 110. In scenario 100, a class hierarchy analysis is performed for class Shape as part of execution of the line "Shape a=h1.getShape( )" as discussed above. The class hierarchy analysis leads to the use of a should_deoptimize variable for guards related to the class Shape.

In modified source 120, a guard for checking a deoptimization indicator represented as a should_deoptimize variable is inserted prior to each of the two method calls for class Shape mentioned above. In particular, modified source 120 includes: a "ShouldDeoptShape" variable for a deoptimization indicator for the class Shape used prior to both the Shape.setSize( ) and Shape.getSize( ) method calls shown in source 110 and modified source 120. In scenario 100, the JIT compiler inserts bytecodes and/or machine-language instructions for guards shown in modified source 120 shortly ahead of program execution (that is, just in time).

If checking a value of a deoptimization indicator for a method call indicates that deoptimization is to occur, software for asynchronous deoptimization, shown as a "deopt( )" function call in modified source 120, can be used to deoptimize the method call. If the method call is not deoptimized, then a devirtualized method call can be performed as indicated by modified source 120. For example, modified source 120 shows that after the "guard for setSize( )" that the "devirtualized call" for "a.SetSize(4)" is executed; that is, a devirtualized call (e.g., direct method call) for the setSize method is executed.

FIG. 1 and Table 3C show runtime trace 130, which indicates actions taken by computing device 102 in executing machine-language instructions corresponding to modified source 120 during scenario 100. Runtime trace 130 begins with "Start main" indicating that execution of modified source 120 begins with calling a "main" function. Runtime trace 130 then shows the results of execution of the "Shape a=h1.getShape( )" line of modified source 120. As mentioned above, during execution of that line of modified source 120, a class hierarchy analysis is performed for class Shape leading to the use of one should_deoptimize variable for guards related to the class Shape. The runtime system allocates register R1 to store a value of the ShouldDeoptShape variable for use as a deoptimization indicator/should_ deoptimize variable and initializes both the ShouldDeoptShape variable and corresponding register R1 to 0.

As indicated by runtime trace 130 and Table 3C, the runtime system executes the guard for the setSize method of class Shape. Runtime trace 130 shows the result of executing the guard for the setSize method with an "If (R1)—fails" indication, as register R1 stores the value of the ShouldDeoptShape variable. Then, as register R1 is equal to 0, the guard for the setSize method fails. As the guard for the setSize method fails, a devirtualized call "a.setSize(4)" is executed that sets the size integer in instance "a" of class Shape equal to four.

Scenario 100 continues with the runtime system executing the guard for the getSize method of class Shape. Runtime trace 130 shows the result of executing the guard for the getSize method with an "If (R1)—fails" indication, as register R1 stores the value of the ShouldDeoptShape variable. Then, as register R1 is equal to 0, the guard for the getSize method fails. As the guard for the getSize method fails, a devirtualized call "a.getSize" is executed, and a temporary variable used by the compiler "tmp" set to the result of the devirtualized call "a.getSize". In scenario 100, the "tmp" variable is subsequently set to a value of four, which is the value of the size integer in instance "a" of class Shape. The runtime system then executes the print function to cause output of "The size of a=4" as further indicated by runtime trace 130 and Table 3C. After the output "The size of a=4" is generated, the "main" function call is complete, as indicated by the "Exit main" statement in runtime trace 130. Once the "main" function call has completed and runtime trace 130 is completely generated, scenario 100 can be completed.

Runtime loading of a class can change the assumptions about a method related to devirtualization. For example, suppose method M of class C is initially assumed to be eligible for optimization/devirtualization. In this example, another implementation of method M is loaded at runtime as part of runtime class loading—then the assumption that method M is eligible for optimization/devirtualization can then be invalidated, and so method M can thereafter be considered ineligible for optimization/devirtualization. Once method M is ineligible for optimization/devirtualization, method M can be assumed to be deoptimized thereafter, and virtual method calls for method M can be utilized.

When deoptimization is triggered at runtime due to class loading, threads can be suspended and a value of a should_deoptimize variable of an invalidated method can be set to 1 (or another non-zero value), and values of should_deoptimize variables that are on the invalidated method's call stack can be patched to 1 (or another non-zero value). Once the now-invalidated method is executed again, a guard testing the value of the should_deoptimize variable for the now-invalidated method when attempting to do a devirtualized call for the method can trigger deoptimization. Then, a virtual method call for the now-invalidated method can be carried out by the interpreter.

In some embodiments, a value for a should_deoptimize variable for a method can be stored in a register. Then, in these embodiments, the guard for a devirtualized call can involve testing a register value and branching based on the register value; i.e., performing a test-and-branch operation utilizing the register. If the value of the should_deoptimize variable is not stored in a register before executing the guard, the value of the should_deoptimize variable can be loaded into a register and a test-and-branch operation can be performed using the register now storing the should_deoptimize variable's value. Loading a value into a register and performing a subsequent test-and-branch operation can be much faster than a vtable-based virtual call, as test-and-branch operations can be very efficient on CPU architectures that use branch prediction.

In some scenarios, class unloading can be supported. Then, an assumption that method M is to be deoptimized can be changed if a class with an implementation of method M is unloaded and reduces the total number of implementations of method M to one. However, class unloading is assumed not to be supported in the remainder of this disclosure—thus, once a method is assumed to be deoptimized, then that assumption will hold for the remainder of program execution.

FIGS. 2A and 2B show scenario 200 involving runtime execution of software for hybrid synchronous/asynchronous deoptimization by computing device 102, in accordance with an example embodiment. During scenario 200, computing device 102 executes a JIT compiler to generate machine-language instructions from bytecodes corresponding to source 210 and 212. In other scenarios, a compiler other than a JIT compiler can be used.

Then, the JIT compiler modifies the bytecodes corresponding to source 210 and 212 and/or adds bytecodes to generate modified bytecodes represented as modified source 220. The JIT compiler generates machine-language instructions from the modified bytecodes. In other scenarios, the JIT compiler can output additional and/or modified machine-language instructions that correspond to modifying source 210 and 212 into modified source 220, rather than modifying and/or adding bytecodes.

In scenario 200, source 210 is stored in one file named "loadfile" and source 212 is stored in a separate file named "mainfile". At an initial stage of scenario 200, only bytecodes representing the software in the "mainfile" file are loaded into computing device 102, and so the JIT compiler initially only generates machine-language instructions from bytecodes represented by source 212. After computing device 102 executes some of these machine-language instructions, software from the "loadfile" file is introduced or loaded into computing device 102. After the "loadfile" file is loaded, the JIT compiler generates machine-language instructions from bytecodes represented by both source 210 and source 212.

After the JIT compiler generates at least some of the machine-language instructions representing modified source 220, computing device 102 uses runtime system software, which includes a bytecode interpreter for executing bytecodes, to execute bytecodes and/or machine-language instructions. In particular, computing device 102 executes the bytecodes and machine-language instructions representing modified source 220 and generates information about the executed software shown as runtime trace 230 in FIG. 2B during scenario 200. After computing device 102 uses the runtime system software to execute the bytecodes and/or machine-language instructions corresponding to modified source 220 and generates runtime trace 230, scenario 200 can end.

Tables 4A, 4B, 4C, and 4D respectively reproduce herein reformatted contents of source 210, source 212, modified source 220, and optimized source 230 shown in FIGS. 2A and 2B. Specifically, FIG. 2A shows source 210, source 212, and modified source 220 and FIG. 2B shows a copy of modified source 220 and optimized source 230.

TABLE 4A

```
// in loadfile file
class Circle extends Shape {
    void printit( ) {
        print("It's a circle!");
    }
    ...
}
class CircleHolder {
    Circle localCircle;
    Circle getCircle( ) { return(localCircle); }
    ...
}
```

TABLE 4B

```
// in mainfile file
class Shape {
    void printit( ) {
        print("It's a shape!");
    }
    ...
}
class ShapeHolder {
    Shape localShape;
    Shape getShape( ) { return(localShape); };
    ...
}
main(...) {
    ShapeHolder h1;
    int some_condition;
    ...
    Shape a = h1.getShape( );
    a.printit( );
    if (some_condition) {
        CircleHolder h2;
        ...
        Shape c = h2.getCircle( );
        c.printit( );
        a.printit( );
    } // end if some_condition
} // end main
```

TABLE 4C

```
main( ){
    ShapeHolder h1;
    int some_condition;
    ...
    Shape a = h1.getShape( );
    if (ShouldDeoptShape){
        deopt( ); }
    devirtualized call a.printit( );
    if (some_condition) {
        CircleHolder h2;
        ...
        Shape c = h2.getCircle( );
        if (ShouldDeoptCircle) {
            deopt( ); }
        devirtualized call c.printit( );
        if(ShouldDeoptShape) {
            deopt( ); }
        devirtualized call a.printit( );
    } // end if some_condition
} // end main
```

TABLE 4D

```
Start main
    ...
    Define Shape a
    Allocate register R1 for ShouldDeoptShape
    Set R1 = 0
    a = h1.getShape( );
    If (R1) - fails
    Perform devirtualized call a.printit( )
    Output: It's a shape!
    if (some_condition) - succeeds
        Load loadfile to define CircleHolder and Circle
        Set R1 = 1
        Allocate register R2 for ShouldDeoptCircle
        Set R2 = 1
        Define CircleHolder h2;
        ...
        Define Shape c;
        c = h2.getCircle( );
        If (R2) - succeeds
            Call deopt( ) / use interpreter for c.printit( );
            Output: It's a circle!
```

TABLE 4D-continued

```
        If (R1) - succeeds
            Call deopt( ) / use interpreter for a.printit( );
            Output: It's a shape!
    Exit main
```

As shown in FIG. 2A and Table 4A, source 210 shows that the "loadfile" file includes a definition of a "class Circle" that "extends" (i.e., is a subclass of) a "Class Shape". The class Circle includes at least one method: "printit( )", which prints a message "It's a circle!". Source 210 also includes definition of a "class CircleHolder" that stores an object of class Circle in a "localCircle" variable, where the localCircle variable can be obtained using the "getCircle( )" method of the CircleHolder class.

As shown in FIG. 2A and Table 4B, source 212 shows that the "mainfile" file includes a definition of the classes Shape and ShapeHolder along with a main function. The class Shape includes at least one method: "printit( )", which prints a message "It's a shape!". Source 212 also includes definition of a "class ShapeHolder" that stores an object of class Shape in a "localShape" variable, where the localShape variable can be obtained using the "getShape( )" method of the ShapeHolder class. Taking source 210 and 212 together, the class Circle is a subclass of class Shape that modifies the printit( ) method of the Shape method. As such, when the class Circle is used at runtime, there are two implementations of the printit( ) method available—one implementation in the class Shape and one implementation in the class Circle.

In scenario 200, the call to the "getShape( )" method in the line "Shape a=h1.getShape( )" leads to class hierarchy analysis for devirtualizing method calls made using the "a" object variable, as the getShape( ) method could be returning either an object of class Shape or an object of a subclass of class Shape. Thus, an initial class hierarchy analysis can be used to determine the actual type of the "a" object of source 110, corresponding method implementations, and possible devirtualization of method calls.

Later in the main function, a test of a "some condition" variable is made. If that test succeeds, the line of "CircleHolder h2;" is executed—this line directly refers to the CircleHolder class and indirectly to the Circle class. As "some_condition" may not always be true, the Circle and CircleHolder classes may not get loaded into the runtime system of computing device 102 unless the line of "CircleHolder h2;" is executed. Particularly for scenario 200, the CircleHolder and Circle classes in the loadfile file had not previously been loaded into the runtime system of computing device 102, so execution of the line "CircleHolder h2;" causes classes CircleHolder and Circle to be loaded into the runtime system; e.g., by following a classpath to find the loadfile file defining classes CircleHolder and Circle and then loading the contents of loadfile into the runtime system.

The line "Shape c=h2.getCircle( )" in the main function of source 212 defines the "c" variable to be an instance of class Shape and sets the "c" variable equal to the result of the getCircle method of the CircleHolder class. As, the getCircle method returns an object of class Circle, the "c" variable is an object of class Circle (which is also an object of class Shape).

Upon loading the CircleHolder and Circle classes, the initial class hierarchy analysis can be updated using dynamic hierarchy analysis to include the newly-loaded classes. The "main" function of source 212 includes three method calls for classes Shape and Circle that can be checked for execution as virtual method calls using deoptimization indicators: the first method call is to class Shape's implementation of printit as "a.printit( )", the second method call is to class Circle's implementation of printit as "c.printit( )", and the third method call is to class Shape's implementation of printit as "a.printit( )". In some embodiments, a method call executed as a virtual method call can be executed by the bytecode interpreter of the runtime system of computing device 102.

FIG. 2A, FIG. 2B, and Table 4C show modified source 220 as source 212 after having been updated for performing a hybrid synchronous/asynchronous deoptimization technique. Modified source 220 illustrates modifications made by the JIT compiler to source 210 and 212. In scenario 200, an initial class hierarchy analysis is performed for class Shape as part of execution of the line "Shape a=h1.getShape( )" as discussed above. The initial class hierarchy analysis leads to the use of a first should_deoptimize variable for guards related to the class Shape. The class hierarchy analysis can be dynamically updated to include class Circle upon execution of the line "CircleHolder h2;" as mentioned above. The updated class hierarchy analysis can lead to use of a second should_deoptimize variable for guards related to the class Circle and/or updating the value of the should_deoptimize variable related to the class Shape.

In modified source 220, a guard for checking a deoptimization indicator represented as a should_deoptimize variable is inserted prior to each of the three method calls regarding classes Shape and Circle mentioned above. In particular, modified source 220 includes: a "ShouldDeoptShape" variable for a deoptimization indicator for the class Shape used prior to the two "a.printit( )" method calls shown in source 212 and a "ShouldDeoptCircle" variable for a deoptimization indicator for the class Circle used prior to the "c.printit( )" method call shown in source 212. In scenario 200, the JIT compiler inserts bytecodes and/or machine-language instructions for guards shown in modified source 220 shortly ahead of program execution.

If checking a value of a deoptimization indicator for a method call indicates that deoptimization is to occur, software for asynchronous deoptimization, shown as a "deopt( )" function call in modified source 220, can be used to deoptimize the method call. If the method call is not deoptimized, then a devirtualized method call is performed as indicated by modified source 220. For example, modified source 220 shows that, after the first "if (ShouldDeoptShape)" statement guarding class Shape is executed, the "a.printit( )" method is executed as a "devirtualized call".

FIG. 2B and Table 4D show runtime trace 230, which indicates actions taken by computing device 102 in executing machine-language instructions and/or bytecodes corresponding to modified source 220 during scenario 200. Runtime trace 230 begins with "Start main" indicating that execution of modified source 220 begins with calling a "main" function.

Runtime trace 230 then shows the results of execution of the "Shape a=h1.getShape( )" line of modified source 220. As mentioned above, during execution of that line of modified source 220, an initial class hierarchy analysis is performed for class Shape only, leading to the use of one should_deoptimize variable for guards related to the class Shape. The class hierarchy analysis only initially includes class Shape as the class Circle is in the "loadfile" file, which is not available for the initial class hierarchy analysis. The runtime system allocates register R1 to store a value of the ShouldDeoptShape variable for use as a deoptimization indicator/should_deoptimize variable and initializes both the ShouldDeoptShape variable and corresponding register R1 to 0.

As indicated by runtime trace 230 and Table 4D, the runtime system then executes the guard for the printit method of class Shape. Runtime trace 230 shows the result of executing the guard for the printit method of class Shape with an "If (R1)—fails" indication, as register R1 stores the value of the ShouldDeoptShape variable. Then, as register R1 is equal to 0, the guard for the printit method of class Shape fails. As the guard for the printit method of class Shape fails, a devirtualized call to a.printit( ) is executed, which causes computing device 102 to output "It's a shape!".

Scenario 200 continues the runtime system executing machine-language instructions to make a test "if (some_condition)". In the scenario, the "some_condition" variable is set to a non-zero value and so the "if (some_condition)" test succeeds as indicated in runtime trace 230. Prior to execution of the "if (some_condition)" test, the classes CircleHolder and Circle had not been loaded into the runtime system of computing device 102.

Scenario 200 continues with the runtime system executing machine-language instructions for the line "CircleHolder h2;" of modified source 220. The machine-language instructions use a classpath to locate an implementation of classes CircleHolder and Circle in the file "loadfile" and attempt to load software from loadfile (i.e., source 210) into computing device 102. In scenario 200, the software in the file loadfile is successfully loaded into the runtime system of computing device 102. Computing device 102 then updates the initial class hierarchy analysis to include the newly loaded classes CircleHolder and Circle, leading to the use of one more should_deoptimize variable for guards related to the class Circle.

Also, the values of the should_deoptimize variable for the class Shape is updated to indicate that class Shape methods are now to be deoptimized, as there are now two implementations for the printit method associated with class Shape. That is, there is one implementation of the printit method provided with class Shape and one implementation of the printit method provided with class Circle. To record that class Shape method calls are now to be deoptimized, the ShouldDeoptShape variable and corresponding register R1 are both set to 1 as shown by the "Set R1=1" indication in runtime trace 230 and Table 4D.

The runtime system of computing device 102 also allocates register R2 to store a value of a new should_deoptimize variable ShouldDeoptCircle. Then, the runtime system initializes the should_deoptimize variable and corresponding register R2 to 1, as there are multiple implementations for methods in class Circle; e.g., the printit method. As such, class Circle method calls are to be deoptimized, as shown by the "Set R2=1" indication in runtime trace 230 and Table 4D.

Scenario 200 continues by defining the variable "h2" as an instance of the CircleHolder class. The runtime system of computing device 102 then executes machine-language instructions for the line "Shape c=h2.getCircle( )" of modified source 220, which defines the "c" variable as an instance of the Shape class and assigns the "c" variable to the result of the getCircle method, causing the "c" variable to be set to an instance of class Circle.

As indicated by runtime trace 230 and Table 4D, the runtime system then executes the guard for the printit method of class Circle. Runtime trace 230 shows the result of executing the guard for the printit method of class Circle with an "If (R2)—succeeds" indication, as register R2 stores the value of the ShouldDeoptCircle variable. Then, as register R2 is equal to 1, the guard for the printit method of class Circle succeeds. As the guard for the printit method of class Circle succeeds, a virtualized call for the printit method of class Circle is executed by the interpreter of computing device 102 as shown by the "Call deopt( )"/use interpreter for c.printit( ) indication in runtime trace 230 and Table 4D. Execution of the printit method of class Circle then causes computing device 102 to output "It's a circle!".

After the interpreter executes the printit method of class Circle, scenario 200 continues with the runtime system executing the guard for the printit method of class Shape. Runtime trace 230 shows the result of executing the guard for the printit method of class Shape with an "If (R1)—succeeds" indication, as register R1 stores the value of the ShouldDeoptShape variable. Then, as register R1 is equal to 1, the guard for the printit method of class Shape succeeds. As the guard for the printit method of class Shape succeeds, a virtualized call for the printit method of class Shape is executed by the interpreter of computing device 102 as shown by the "Call deopt( )/use interpreter for a.printit( )" indication in runtime trace 230 and Table 4D.

Prior to the loading of the loadfile in scenario 200, the guard for the printit method of class Shape succeeded, but as indicated in the paragraph immediately above, the guard for the printit method of class Shape failed after loading the loadfile. As such, the guard for the printit method was able to correct at runtime an incorrect assumption (i.e., that there was only one implementation of the printit method) made during the initial class hierarchy analysis.

Execution of the printit method of class Shape then causes computing device 102 to output "It's a shape!". After the output "It's a shape!" is generated, the "main" function call is complete, as indicated by the "Exit main" statement in runtime trace 230. Once the "main" function call has completed and runtime trace 230 is completely generated, scenario 200 can be completed.

In other scenarios, once execution transfers to the interpreter, execution does not return to compiled code. In these scenarios, guards may not be inserted into source code and/or executed once the interpreter has been invoked.

Example Scenarios for Optimizing Deoptimization Guards

Performance of hybrid synchronous/asynchronous deoptimization can be improved using herein-described optimization techniques that eliminate some guards that test values of should_deoptimize variables while maintaining program correctness. In scenarios 300, 400, 500, 600, and 700, and in the discussion below, a variable "receiver" is an instance of a class "A" that has one or more methods, such as "getX( )" and "getY( )" methods.

A first optimization technique can eliminate guards when the receiver variable is passed as a parameter; e.g., to a method, function, or procedure. When compiled code is entered, all the devirtualization assumptions made using class hierarchy analysis at that point are still true. Otherwise the compiled code should have been invalidated and an entry point for the method should be set to invoke the interpreter. For example, when the receiver variable is passed as a parameter to a method M1, receiver.getX( ) still resolves to A.getX( ) when compiled code for method M1 is entered. Thus, guards for devirtualized virtual calls on the receiver parameter within the body of method M1 are unnecessary.

FIG. 3 illustrates scenario 300 where computing device 102 determines optimized source 330 associated with hybrid synchronous/asynchronous deoptimization, in accordance with an example embodiment. During scenario 300, computing device 102 executes a JIT compiler to generate machine-language instructions from bytecodes corresponding to source 310. In other scenarios, a compiler other than a JIT compiler can be used.

Then, the JIT compiler modifies bytecodes corresponding source 310 and/or adds bytecodes to generate modified bytecodes represented as optimized source 330, where optimized source 330 also represents modified source 320 that has been optimized using the first optimization technique. The JIT compiler generates machine-language instructions from the modified bytecodes. In other scenarios, the JIT compiler can output additional and/or modified machine-language instructions that correspond to modifying source 310 and/or modified source 320 into optimized source 330, rather than modifying and/or adding bytecodes.

After the JIT compiler generates at least some of the machine-language instructions for optimized source 330, computing device 102 uses runtime system software, which includes a bytecode interpreter for executing bytecodes, to execute bytecodes and/or machine-language instructions. In particular, computing device 102 executes the bytecodes and machine-language instructions representing optimized source 330 during scenario 300. After computing device 102 uses the runtime system software to execute the bytecodes and/or machine-language instructions corresponding to optimized source 330, scenario 300 can end.

Tables 5A, 5B, and 5C respectively reproduce herein reformatted contents of source 310, modified source 320, and optimized source 330 shown in FIG. 3.

TABLE 5A

```
class A {
    int X = 0;
    int Y = 1;
    public int getX( )
        { return(X) };
    public int getY( )
        { return(Y) };
    ...
}
class AHolder {
    A localA;
    public A getA( ) { return(localA); };
    ...
}
void printXY(A in) {
    print("X=",in.getX( ),"Y=",in.getY( ));
}
main(...) {
    AHolder h1;
    ...
    A receiver = h1.getA( );
    printXY(receiver);
}
```

TABLE 5B

```
void printXY(A in) {
    // guard for getX( )
    if (ShouldDeoptA) {
        deopt( );
    }
    tmp1 = devirtualized call in.getX( );
    // guard for getY( )
    if (ShouldDeoptA) {
        deopt( );
    }
    tmp2 = devirtualized call in.getY( );
    print("X=",tmp1,"Y=",tmp2);
}
```

TABLE 5B-continued

```
main(...) {
    AHolder h1;
    ...
    A receiver = h1.getA( );
    // guard for parameter
    if (ShouldDeoptA) {
        deopt( );
    }
    printXY(receiver);
}
```

TABLE 5C

```
void printXY(A in) {
    // guard for getX( ) removed
    tmp1 = devirtualized call in.getX( );
    // guard for getY( ) removed
    tmp2 = devirtualized call in.getY( );
    print("X=",tmp1,"Y=",tmp2);
}
main(...) {
    AHolder h1;
    ...
    A receiver = h1.getA( );
    // guard for parameter
    if (ShouldDeoptA) {
        deopt( );
    }
    printXY(receiver);
}
```

As shown in FIG. 3 and Table 5A, source 310 shows that "class A" includes at least two integer variables—"X" and "Y"—and at least two methods: "getX( )", which returns the value of the X integer variable and "getY( )", which returns the value of the Y integer variable. Source 310 also includes definition of a "class AHolder" that includes at least an object of class A in a "localA" variable, where the localA variable can be obtained using the "getA( )" method of the AHolder class.

In scenario 300, the call to the "getA( )" method in the line "A receiver=h1.getA( )" leads to class hierarchy analysis for devirtualizing method calls made using the "receiver" object variable, as the getA( ) method could be returning either an object of class A or an object of a subclass of class A. A class hierarchy analysis can determine the actual type of the "receiver" object of source 310, corresponding method implementations, and possible devirtualization of method calls. Source 310 shows calls to each of methods "getX( )" and "getY( )" of class A in the "printXY" function—these method calls can be checked for execution as virtual method calls using deoptimization indicators. In some embodiments, a method call executed as a virtual method call can be executed by the bytecode interpreter of the runtime system of computing device 102.

FIG. 3 and Table 5B show modified source 320 as source 310 after being updated for performing a hybrid synchronous/asynchronous deoptimization technique. Modified source 320 illustrates modifications made by the JIT compiler to source 310. In scenario 300, a class hierarchy analysis is performed for class A as part of execution of the line "A receiver=h1.getA( )" as discussed above. The class hierarchy analysis leads to the use of a should_deoptimize variable for guards related to the class A.

In modified source 320, a guard for checking a deoptimization indicator represented as a should_deoptimize variable are inserted prior to the printXY function call that utilizes the "receiver" object as a variable and prior to each of the two method calls within the printXY function mentioned above. In particular, modified source 320 includes a "ShouldDeoptA" variable for a deoptimization indicator for the class A used prior to the printXY function call and the A.getX( ) and A.getY( ) method calls shown in source 310 and modified source 130. In scenario 100, the JIT compiler inserts bytecodes and/or machine-language instructions for guards shown in modified source 320 shortly ahead of program execution.

If checking a value of a should_deoptimize variable for a method call indicates that deoptimization is to occur, software for asynchronous deoptimization, shown as a "deopt( )" function call in modified source 320, can be used to deoptimize the method call. If the method call is not deoptimized, then a devirtualized method call can be performed as indicated by modified source 320. For example, modified source 320 shows that after the "guard for getX( )", then the "tmp1" variable is assigned to a result of a "devirtualized call" for "in.getX( )"; that is, a devirtualized call to the getX( ) method of class A.

FIG. 3 and Table 5C show optimized source 330, which is modified source 320 after being further modified (optimized) using the first optimization technique to reduce the number of guards in modified source 320. In particular, guards for the getX( ) and getY( ) method calls in the printXY function have been eliminated from optimized source 330, as the getX( ) and getY( ) method calls are preceded in execution by the "guard for parameter" that is before the printXY function call in the main function.

Since the printXY function call already has a guard, that guard can ensure all instances of A within the body of the printXY function are eligible (or, in other scenarios, ineligible) for virtualization at that point, and so invoking the getX( ) and getY( ) methods will resolve to respective direct method calls to A.getX( ) and A.getY( ) In other scenarios, the if statement for the guard prior to the printXY function call can take a true branch (i.e., ShouldDeoptA is TRUE), and deoptimization will ensue. Thus, the guard prior to the printXY function call ensures all devirtualization assumptions for class A within the body of the printXY function are still correct since any change of assumptions would have set one or more should_deoptimize variables to non-zero values. So, if the guard prior to the printXY function call allows devirtualization, all virtual calls that are devirtualized should resolve to their corresponding direct calls. Since the receiver instance is defined before the printXY function is executed, any devirtualized method calls within the body of the printXY function involving the class A "in" parameter should also resolve to their corresponding direct calls as the type of the "in" parameter should not change after being initially assigned in accord with a static single assignment property.

A second optimization technique can be performed by eliminating guards for specific devirtualized method calls as long as there is a guard in any path between a class instance's definition; e.g., the definition of the receiver variable as an instance of class A, and the actual devirtualized method call.

FIG. 4 illustrates scenario 400 where computing device 102 determines optimized source 430 associated with hybrid synchronous/asynchronous deoptimization, in accordance with an example embodiment. During scenario 400, computing device 102 executes a JIT compiler to generate machine-language instructions from bytecodes corresponding to source 410. In other scenarios, a compiler other than a JIT compiler can be used.

Then, the JIT compiler modifies bytecodes corresponding to source 410 and/or adds bytecodes to generate modified bytecodes represented as optimized source 430, where optimized source 430 also represents modified source 420 that has been optimized using the second optimization technique. The JIT compiler generates machine-language instructions from the modified bytecodes. In other scenarios, the JIT compiler can output additional and/or modified machine-language instructions that correspond to modifying source 410 and/or modified source 420 into optimized source 430, rather than modifying and/or adding bytecodes.

After the JIT compiler generates at least some of the machine-language instructions for optimized source 430, computing device 102 uses runtime system software, which includes a bytecode interpreter for executing bytecodes, to execute bytecodes and/or machine-language instructions. In particular, computing device 102 executes the bytecodes and machine-language instructions representing optimized source 430 during scenario 400. After computing device 102 uses the runtime system software to execute the bytecodes and/or machine-language instructions corresponding to optimized source 430, scenario 400 can end.

Tables 6A, 6B, and 6C respectively reproduce herein reformatted contents of source 410, modified source 420, and optimized source 430 shown in FIG. 4.

TABLE 6A

```
class A {
    int X = 0;
    int Y = 1;
    public void getX( )
        { return(X); };
    public void getY( )
        { return(Y); };
    ...
}
class AHolder {
    A localA;
    public A getA( ) { return(localA); };
    ...
}
main(...) {
    AHolder h1;
    ...
    A receiver = h1.getA( );
    int localX = receiver.getX( );
    int localY = receiver.getY( );
    print("receiver: X=",localX,"Y=",localY);
} // end main
```

TABLE 6B

```
main(...) {
    AHolder h1;
    ...
    A receiver = h1.getA( );
    int localX;
    // guard for getX( )
    if (ShouldDeoptA) {
        deopt( );
    }
    localX = devirtualized call receiver.getX( );
    int localY;
    // guard for getY( )
    if (ShouldDeoptA) {
        deopt( );
    }
    localY = devirtualized call receiver.getY( );
    print("receiver: X=",localX,"Y=",localY);
} // end main
```

TABLE 6C

```
main(...) {
    AHolder h1;
    ...
    A receiver = h1.getA( );
    int localX;
    // guard for getX( )
    if (ShouldDeoptA) {
        deopt( );
    }
    localX = devirtualized call receiver.getX( );
    int localY;
    // guard for getY( ) removed
    localY = devirtualized call receiver.getY( );
    print("receiver: X=",localX,"Y=",localY);
} // end main
```

As shown in FIG. 4 and Table 6A, source 410 shows that "class A" includes at least two integer variables—"X" and "Y"—and at least two methods: "getX( )", which returns the value of the X integer variable and "getY( )", which returns the value of the Y integer variable. Source 410 also includes definition of a "class AHolder" that includes at least an object of class A in a "localA" variable, where the localA variable can be obtained using the "getA( )" method of the AHolder class.

In scenario 400, the call to the "getA( )" method in the line "A receiver=h1.getA( )" leads to class hierarchy analysis for devirtualizing method calls made using the "receiver" object variable, as the getA( ) method could be returning either an object of class A or an object of a subclass of class A. A class hierarchy analysis can determine the actual type of the "receiver" object of source 410, corresponding method implementations, and possible devirtualization of method calls. Source 410 shows calls to each of methods "getX( )" and "getY( )" of class A in the "main" function—these method calls can be checked for execution as virtual method calls using deoptimization indicators. In some embodiments, a method call executed as a virtual method call can be executed by the bytecode interpreter of the runtime system of computing device 102.

FIG. 4 and Table 6B show modified source 420 as source 410 after being updated for performing a hybrid synchronous/asynchronous deoptimization technique. In scenario 400, a class hierarchy analysis is performed for class A as part of execution of the line "A receiver=h1.getA( )" as discussed above. The class hierarchy analysis leads to the use of a should_deoptimize variable for guards related to the class A.

In modified source 420, a guard for checking a deoptimization indicator represented as a should_deoptimize variable is inserted prior to getX( ) and getY( ) method calls for class A mentioned above. In particular, modified source 420 includes a "ShouldDeoptA" variable for a deoptimization indicator for the class A used prior to the getX( ) and getY( ) method calls.

If checking a value of a should_deoptimize variable for a method call indicates that deoptimization is to occur, software for asynchronous deoptimization, shown as a "deopt( )" function call in modified source 420, can be used to deoptimize the method call. If the method call is not deoptimized, then a devirtualized method call is performed as indicated by modified source 420. For example, modified source 420 shows that after the "guard for getX( )", then the "localX" variable is assigned to a result of a "devirtualized call" for "receiver.getX( )"; that is, a devirtualized call to the getX( ) method of class A.

FIG. 4 and Table 6C show optimized source 430, which is modified source 420 after being further modified (optimized) using the second optimization technique to reduce the number of guards in modified source 420. In particular, a guard for the getY( ) method call in the main function have been eliminated from optimized source 430, as the getY( ) method call is preceded in execution by the guard for the getX( ) method call.

Since the getX( ) method call already has a guard, that guard can ensure all instances of class A are eligible (or, in other scenarios, ineligible) for virtualization at that point, and so a later invocation of the getY( ) method will resolve to a direct method call to A.getY( ) In other scenarios, the if statement for the guard for the getX( ) method call can take a true branch (i.e., ShouldDeoptA is TRUE), and deoptimization will ensue. Thus, the guard for the getX( ) method call ensures all devirtualization assumptions for class A after the getX( ) method call are still correct since any change of assumptions would have set one or more should_deoptimize variables to non-zero values. So, if the guard for the getX( ) method call allows devirtualization, all virtual calls that are devirtualized should resolve to their corresponding direct calls. Since the receiver instance is defined before the guard for the getX( ) method call is executed, any devirtualized method calls involving the receiver instance should also resolve to their corresponding direct call as the type of the receiver instance should not change after being initially assigned in accord with a static single assignment property.

In some examples, the second optimization technique can involve use of a dominating guard before a first invocation of any method for a class in a block of software to ensure there is a guard is in any path between a class instance's definition and a devirtualized method call for the class. In other examples, the second optimization technique can be performed as part of another compiler optimization technique, such as Global Value Numbering.

A third optimization technique can involve moving a guard inside a loop body outside of the loop body if a class instance is defined prior to the loop. The second and third optimization techniques are based on the same rationale— that is, a guard can not only be eliminated, but also moved along the dominating tree path all the way up to its definition. Moving a guard up can be easily piggybacked on some standard code motion which hoists loop invariants out of loops. In some examples, the third optimization technique can be performed as part of another optimization technique, such as a code motion which moves loop invariants out of loop bodies.

FIG. 5 illustrates scenario 500 where computing device 102 determines optimized source 530 associated with hybrid synchronous/asynchronous deoptimization, in accordance with an example embodiment. During scenario 500, computing device 102 executes a JIT compiler to generate machine-language instructions from bytecodes corresponding to source 510. In other scenarios, a compiler other than a JIT compiler can be used.

Then, the JIT compiler modifies bytecodes corresponding to source 510 and/or adds bytecodes to generate modified bytecodes represented as optimized source 530, where optimized source 530 also represents modified source 520 that has been optimized using the third optimization technique. The JIT compiler generates machine-language instructions from the modified bytecodes. In other scenarios, the JIT compiler can output additional and/or modified machine-language instructions that correspond to modifying source 510 and/or modified source 520 into optimized source 530, rather than modifying and/or adding bytecodes.

After the JIT compiler generates at least some of the machine-language instructions for optimized source 530, computing device 102 uses runtime system software, which includes a bytecode interpreter for executing bytecodes, to execute bytecodes and/or machine-language instructions. In particular, computing device 102 executes the bytecodes and machine-language instructions representing optimized source 530 during scenario 500. After computing device 102 uses the runtime system software to execute the bytecodes and/or machine-language instructions corresponding to optimized source 530, scenario 500 can end.

Tables 7A, 7B, and 7C respectively reproduce herein reformatted contents of source 510, modified source 520, and optimized source 530 shown in FIG. 5.

TABLE 7A

```
class A {
    int X = 0;
    int Y = 1;
    public void setX(int inX)
        { X = inX; };
    public void setY(int inY)
        { Y = inY; };
    public int getX( )
        { return(X); };
    public int getY( )
        { return(Y); };
    ...
}
class AHolder {
    A localA;
    public A getA( ) { return(localA); };
    ...
}
main(...) {
    AHolder h1;
    ...
    A receiver = h1.getA( );
    int i;
    for (i = 0; i < 10; i++) {
        receiver.setX(i*4);
        print("X=",receiver.getX( ));
    } // end for loop
} // end main
```

TABLE 7B

```
main(...) {
    AHolder h1;
    ...
    A receiver = h1.getA( );
    int i;
    for (i = 0; i < 10; i++) {
        // guard for setX( )
        if (ShouldDeoptA) {
            deopt( );
        }
        tmp1 = i * 4;
        devirtualized call receiver.setX(tmp1);
        // guard for getX( )
        if (ShouldDeoptA) {
            deopt( );
        }
        tmp1 = devirtualized call receiver.getX( );
        print("X=",tmp1);
    } // end for loop
} // end main
```

TABLE 7C

```
main(...) {
    AHolder h1;
    ...
    A receiver = h1.getA( );
    int i;
    // guard moved out of loop
    if (ShouldDeoptA) {
        deopt( );
    }
    for (i = 0; i < 10; i++) {
        // guard for setX removed
        tmp1 = i * 4;
        devirtualized call receiver.setX(tmp1);
        // guard for getX removed
        tmp1 = devirtualized call receiver.getX( );
        print("X=",tmp1);
    } // end for loop
} // end main
```

As shown in FIG. 5 and Table 7A, source 510 shows that "class A" includes at least two integer variables—"X" and "Y"—and at least four methods: "setX(int inX)", which assigns the value of the X integer variable to a value of an input parameter "inX", "setY(int inY)", which assigns the value of the Y integer variable to a value of an input parameter "inY", "getX( )", which returns the value of the X integer variable, and "getY( )", which returns the value of the Y integer variable. Source 510 also includes definition of a "class AHolder" that includes at least an object of class A in a "localA" variable, where the localA variable can be obtained using the "getA( )" method of the AHolder class.

In scenario 500, the call to the "getA( )" method in the line "A receiver=h1.getA( )" leads to class hierarchy analysis for devirtualizing method calls made using the "receiver" object variable, as the getA( ) method could be returning either an object of class A or an object of a subclass of class A. A class hierarchy analysis can determine the actual type of the "receiver" object of source 510, corresponding method implementations, and possible devirtualization of method calls. Source 510 shows calls to each of methods setX( ) and getX( ) of class A in the "main" function—these method calls can be checked for execution as virtual method calls using deoptimization indicators. In some embodiments, a method call executed as a virtual method call can be executed by the bytecode interpreter of the runtime system of computing device 102.

FIG. 5 and Table 7B show modified source 520 as source 510 after being updated for performing a hybrid synchronous/asynchronous deoptimization technique. In scenario 500, a class hierarchy analysis is performed for class A as part of execution of the line "A receiver=h1.getA( )" as discussed above. The class hierarchy analysis leads to the use of a should_deoptimize variable for guards related to the class A.

In modified source 520, a guard for checking a deoptimization indicator represented as a should_deoptimize variable is inserted prior to setX( ) and getX( ) method calls for class A mentioned above. In particular, modified source 520 includes a "ShouldDeoptA" variable for a deoptimization indicator for the class A used prior to the setX( ) and getX( ) method calls. If checking of a should_deoptimize variable for a method call indicates that deoptimization is to occur, software for asynchronous deoptimization, shown as a "deopt( )" function call in modified source 520, can be used to deoptimize the method call. If the method call is not deoptimized, then a devirtualized method call is performed as indicated by modified source 520. For example, modified source 520 shows that after the "guard for setX( )" that a "devirtualized call" to "receiver.setX(tmp)" is performed, which can be a devirtualized call to the setX( ) method of class A.

FIG. 5 and Table 7C show optimized source 530, which is modified source 520 after being further modified (optimized) using the third optimization technique to reduce the number of guards in modified source 520. In particular, guards for the two method calls within the body of the loop in modified source 520 have been replaced by a new guard of optimized source 530 inserted prior to the loop's body, where the setX( ) and getX( ) method calls in the loop's body are preceded in execution by the new guard.

Since the loop's body is preceded by a guard, that guard can ensure all instances of A are eligible (or, in other scenarios, ineligible) for virtualization at that point, and so invoking the setX( ) and getX( ) methods within the loop's body will resolve to respective direct method calls to A.getX( ) and A.getY( ) In other scenarios, the if statement for the guard preceding the loop's body can take a true branch (i.e., ShouldDeoptA is TRUE), and deoptimization will ensue. Thus, the guard preceding the loop's body ensures all devirtualization assumptions for class A are still correct since any change of assumptions would have set one or more should_deoptimize variables to non-zero values. So, if the guard preceding the loop's body allows devirtualization, all virtual calls that are devirtualized within the loop body should resolve to their corresponding direct calls. Since the receiver instance is defined before the guard preceding the loop's body is executed, any devirtualized method calls involving the receiver instance in the loop's body should also resolve to their corresponding direct calls as the type of the receiver instance should not change after being assigned in accord with a static single assignment property.

In embodiments where code patching is allowed, a compiler may not have to generate software for guards that explicitly check deoptimization indicators. The compiler can maintain a list of potential deoptimization points. Then, invalidating compiled code can involve patching a starting position of each potential deoptimization site to jump to deoptimization software that invalidates an instruction cache. In these embodiments, thread suspension is not necessary. Optimizations related to eliminating guards, and in these embodiments applied to eliminating potential deoptimization points, can be beneficial even when no guard software is explicitly generated. Rather, as each potential deoptimization point still has some associated overhead (i.e., slow path software, corresponding metadata support which can keep register live longer, preventing certain types of code motion), reducing the number of potential deoptimization points can reduce overhead for hybrid synchronous/asynchronous deoptimization.

A fourth optimization technique can involve using only one deoptimization indicator for a software application. If any devirtualization assumption is incorrect; that is, if any method of the software application is not eligible for devirtualization, the guard value can be set to deny virtualization for all methods. This optimization technique can reduce the number of deoptimization indicators used for a software application. In some examples, two or more of the herein-described optimization techniques can be used together; e.g., the fourth optimization technique can be combined with use of the first, second, and/or third optimization techniques.

FIGS. 6A and 6B illustrate scenario 600 where computing device 102 determines optimized source 630 associated with hybrid synchronous/asynchronous deoptimization, in accordance with an example embodiment. During scenario 600, computing device 102 executes a JIT compiler to generate machine-language instructions from bytecodes corresponding to source 610. In other scenarios, a compiler other than a JIT compiler can be used.

Then, the JIT compiler modifies bytecodes corresponding to source 610 and/or adds bytecodes to generate modified bytecodes represented as optimized source 630, where optimized source 630 represents optimized source 622 that has been further optimized using the second optimization technique, where optimized source 622 represents modified source 620 that has been optimized using a per-application deoptimization indicator according to the fourth optimization technique, and where modified source 620 shows source 610 that has been modified using per-class deoptimization indicators. The JIT compiler generates machine-language instructions from the modified bytecodes. In other scenarios, the JIT compiler can output additional and/or modified machine-language instructions that correspond to modifying source 610, modified source 620, and/or optimized source 622 into optimized source 630, rather than modifying and/or adding bytecodes.

In still other scenarios, rather modification of source 610 can involve per-application deoptimization indicators leading to direct generation of optimized source 622; that is, in these scenarios modified source 620 is not generated.

After the JIT compiler generates at least some of the machine-language instructions for optimized source 630, computing device 102 uses runtime system software, which includes a bytecode interpreter for executing bytecodes, to execute bytecodes and/or machine-language instructions. In particular, computing device 102 executes the bytecodes and machine-language instructions representing optimized source 630 during scenario 600. After computing device 102 uses the runtime system software to execute the bytecodes and/or machine-language instructions corresponding to optimized source 630, scenario 600 can end.

Tables 8A, 8B, 8C, and 8D respectively reproduce herein reformatted contents of source 610, modified source 620, optimized source 622, and optimized source 630 shown in FIG. 6.

TABLE 8A

```
class A {
    int X = 0;
    public void setX(int inX)
        { X = inX; };
    public int getX( )
        { return(X); };
    ...
}
class B {
    int Y = 0;
    public void setY(int inY)
        { Y = inY; };
    public int getY( )
        { return(Y); };
    ...
}
class AHolder {
    A localA;
    public A getA( ) { return(localA); };
    ...
}
class BHolder {
    B localB;
    public B getB( ) { return(localB); };
    ...
}
```

TABLE 8A-continued

```
main(...) {
    Aholder hA;
    Bholder hB;
    int x, y;
    ...
    A receiverA = hA.getA( );
    B receiverB = hB.getB( );
    receiverA.setX(x);
    receiverB.setY(y);
    print("X * Y =",receiverA.getX( ) * receiverB.getY( ));
} // end main
```

TABLE 8B

```
main(...) {
    Aholder hA;
    Bholder hB;
    int x, y;
    ...
    A receiverA = hA.getA( );
    B receiverB = hB.getB( );
    // guard for setX( )
    if (ShouldDeoptA) {
        deopt( );
    }
    devirtualized call receiverA.setX(x);
    // guard for setY( )
    if (ShouldDeoptB) {
        deopt( );
    }
    devirtualized call receiverB.setY(y);
    // guard for getX( )
    if (ShouldDeoptA) {
        deopt( );
    }
    tmp1 = devirtualized call receiverA.getX( );
    // guard for getY( )
    if (ShouldDeoptB) {
        deopt( );
    }
    tmp2 = devirtualized call receiverB.getY( );
    tmp2 = tmp2 * tmp1;
    print("X * Y =",tmp2);
} // end main
```

TABLE 8C

```
main(...) {
    Aholder hA;
    Bholder hB;
    int x, y;
    ...
    A receiverA = hA.getA( );
    B receiverB = hB.getB( );
    // guard for setX( )
    if (ShouldDeoptALL) {
        deopt( );
    }
    devirtualized call receiverA.setX(x);
    // guard for setY( )
    if (ShouldDeoptALL) {
        deopt( );
    }
    devirtualized call receiverB.setY(y);
    // guard for getX( )
    if (ShouldDeoptALL) {
        deopt( );
    }
    tmp1 = devirtualized call receiverA.getX( );
    // guard for getY( )
    if (ShouldDeoptALL) {
        deopt( );
    }
```

TABLE 8C-continued

```
        tmp2 = devirtualized call receiverB.getY( );
        tmp2 = tmp2 * tmp1;
        print("X * Y =",tmp2);
    } // end main
```

TABLE 8D

```
main(...) {
    Aholder hA;
    Bholder hB;
    int x, y;
    ...
    A receiverA = hA.getA( );
    B receiverB = hB.getB( );
    // guard for setX( )
    if (ShouldDeoptALL) {
        deopt( );
    }
    devirtualized call receiverA.setX(x);
    // guard for setY( ) removed
    devirtualized call receiverB.setY(y);
    // guard for getX( ) removed
    tmp1 = devirtualized call receiverA.getX( );
    // guard for getY( ) removed
    tmp2 = devirtualized call receiverB.getY( );
    tmp2 = tmp2 * tmp1;
    print("X * Y =",tmp2);
} // end main
```

As shown in FIG. 6A and Table 8A, source 610 shows that "class A" includes at least one integer variable—"X"—and at least two methods: "setX(int inX)", which assigns the value of the X integer variable to a value of an input parameter "inX" and "getX( )", which returns the value of the X integer variable. Source 610 also shows that "class B" includes at least one integer variable—"Y" and at least two methods "setY(int inY)", which assigns the value of the Y integer variable to a value of an input parameter "inY" and "getY( )", which returns the value of the Y integer variable. Source 610 further includes definition of a "class AHolder" that includes at least an object of class A in a "localA" variable, where the localA variable can be obtained using the "getA( )" method of the AHolder class and definition of a "class BHolder" that includes at least an object of class B in a "localB" variable, where the localB variable can be obtained using the "getB( )" method of the BHolder class.

In scenario 600, the call to the "getA( )" method in the line "A receiverA=hA.getA( )" leads to class hierarchy analysis for devirtualizing method calls made using the "receiverA" object variable, as the getA( ) method could be returning either an object of class A or an object of a subclass of class A. Similarly, the line "B receiverB=hB.getB( )" could lead to class hierarchy analysis for devirtualizing method calls made using the "receiverB" object variable, as the getB( ) method could be returning either an object of class B or an object of a subclass of class B.

A class hierarchy analysis can determine the actual types of the "receiverA" and "receiverB" objects of source 610, corresponding method implementations, and possible devirtualization of method calls. Source 610 shows calls to each of methods setX( ) and getX( ) of class A and each of methods setY( ) and getY( ) of class B in the "main" function—these method calls can be checked for execution as virtual method calls using deoptimization indicators. In some embodiments, a method call executed as a virtual method call can be executed by the bytecode interpreter of the runtime system of computing device 102.

FIG. 6A and Table 8B show modified source 620 as source 610 after being updated for performing a hybrid synchronous/asynchronous deoptimization technique. In scenario 600, a class hierarchy analysis is performed for classes A and B as part of execution of the line "A receiver=h1.getA( )". The class hierarchy analysis leads to the use of two should_deoptimize variables: one variable for guards related to the class A and one variable for guards related to the class B.

In modified source 620, a guard for checking a per-class deoptimization indicator for class A represented as a should_deoptimize variable is inserted prior to each of the setX( ) and getX( ) method calls for class A mentioned above, and a guard for checking a deoptimization indicator for class B represented as a should_deoptimize variable is inserted prior to each of the setY( ) and getY( ) method calls for class B mentioned above. In particular, modified source 620 includes a "ShouldDeoptA" variable for a deoptimization indicator for class A used prior to the setX( ) and getX( ) method calls and a "ShouldDeoptB" variable for a deoptimization indicator for class B used prior to the setY( ) and getY( ) method calls.

If checking of a should_deoptimize variable for a method call indicates that deoptimization is to occur, software for asynchronous deoptimization, shown as a "deopt( )" function call in modified source 620, can be used to deoptimize the method call. If the method call is not deoptimized, then a devirtualized method call is performed as indicated by modified source 620. For example, modified source 620 shows that after the "guard for setX( )" that a "devirtualized call" to "receiverA.setX(x)" is performed, which can be a devirtualized call to the setX( ) method of class A.

FIG. 6B and Table 8C show optimized source 622 which is modified source 620 after being further modified (optimized) using the fourth optimization technique to reduce the number of guard variables in modified source 620. In particular, optimized source 622 replaces usage of the per-class "ShouldDeoptA" and "ShouldDeoptB" deoptimization indicators/should_deoptimize variables found in modified source 620 with a per-application "ShouldDeoptALL" deoptimization indicator/should_deoptimize variable. FIG. 6B and Table 8C show that each of the four guards of optimized source 622 use the per-application "ShouldDeoptALL" deoptimization indicator/should_deoptimize variable.

FIG. 6B and Table 8D show optimized source 630, which is modified source 620 after being further modified (optimized) using the second optimization technique to reduce the number of guards in modified source 620. In particular, guards for the setY( ), getX( ), and getY( ) method calls in the main function have been eliminated from optimized source 430, as the setY( ), getX( ), and getY( ) method calls are preceded in execution by the guard for the setX( ) method call. Note that, even though the setY( ) method call in the main function is the first method call to a method of class B, both the guard for the setY( ) method call and the guard for the setX( ) method preceding the setY( ) method call test the per-application "ShouldDeoptALL" deoptimization indicator. As such, the guard for the setY( ) method call makes the same test as the preceding guard for the setX( ) method call. Then, applying the second deoptimization technique allows for removal of the guard for the setY( ) method call. Thus, optimized source 630 only has one guard testing the per-application "ShouldDeoptALL" deoptimization indicator after application of the fourth and second optimization techniques.

In some embodiments, per-class should_deoptimize variables (deoptimization indicators) can be used, such as indicated above in the context of scenarios 100, 200, 300, 400, 500, 600, and 700; e.g., the ShouldDeoptShape variable used in scenarios 100 and 200 and the ShouldDeoptA variable used in scenarios 300, 400, 500, 600, and 700. In other embodiments, one per-application should_deoptimize variable (deoptimization indicator) can be used for all classes of a software application; e.g., the ShouldDeoptAll variable used in scenario 600.

In even other embodiments, per-method should_deoptimize variables (deoptimization indicators) are used. As a particular example where per-method should_deoptimize variables are used, suppose a class CL1 has two methods: a method M_MANY and a method M_ONLY, where class CL1 is included with software initially loaded for program execution, and that when class CL1 is initially loaded, each of methods M_MANY and M_ONLY have only one implementation. A runtime system can examine a class hierarchy generated by class hierarchy analysis of the initially-loaded software to determine that each of methods M_MANY and M_ONLY initially have only one implementation. Then, the runtime system can initialize values of a deoptimization indicator ShouldDeoptCL1M_MANY for method M_MANY and a deoptimization indicator ShouldDeoptCL1M_ONLY for method M_ONLY to 0, indicating assumptions that both methods M_MANY and M_ONLY are allowed (eligible) to be optimized/devirtualized.

Continuing this example, suppose that, during runtime, additional software is loaded that includes a subclass CL2 of class CL1, where subclass CL2 includes another implementation for method M_MANY but does not include another implementation for M_ONLY. The runtime system can determine that method M_MANY has two implementations and M_ONLY has one implementation by re-executing the class hierarchy analysis to update the class hierarchy after loading the additional software, and then examining the updated class hierarchy to obtain implementation information about the methods of the now-combined initially-loaded software and additional software.

As method M_ONLY still has only one implementation after loading the additional software, then the runtime system can maintain (not change) the 0 value for the deoptimization indicator ShouldDeoptCL1M_ONLY. By maintaining the value for ShouldDeoptCL1M_ONLY, the runtime system indicates that method M_ONLY is still allowed to be optimized after loading the additional software. In contrast, since method M_MANY has two implementations after loading the additional software, the runtime system can change the value for the deoptimization indicator ShouldDeoptCL1M MANY to 1 (or another non-zero value). By changing the value for ShouldDeoptCL1M MANY to a non-zero value, the runtime system indicates that method M_MANY is denied (ineligible) from optimization/devirtualization after loading the additional software.

In yet other embodiments, part or all of the functionality described herein as being performed by a JIT compiler can be performed by an AOT compiler. For example, an AOT compiler can utilize profiling information, including information provided using class hierarchy analysis that has been gathered at runtime, to perform part or all of the functionality described herein as being performed by a JIT compiler.

In some embodiments, a compiler, such as a JIT compiler and/or an AOT compiler, can have information indicating one or more locations within a thread where thread suspension is possible. In these embodiments, a fifth optimization technique can eliminate guards in a portion of software determined by the compiler that thread suspension will not occur; i.e., thread suspension is not possible in the portion of software. After determining that thread suspension does not occur in a portion of software, the compiler can determine that deoptimization indicator values will remain unchanged throughout the portion of software, since deoptimization indicator values can change only while the thread is suspended.

Then, the compiler can eliminate redundant guards from the portion of software where thread suspension will not occur. For example, let portion P0 be a portion of software where the compiler has determined thread suspension will not occur. Then, an initial guard IG1 in portion P0 can be executed to check a deoptimization indicator determine whether an initial method call is to be executed as a virtual method call. Then, all guards that check the deoptimization indicator and are subsequent to guard IG1 within portion P0 can be eliminated, as the subsequent guards in portion P0 are redundant to guard IG1. Other examples are possible as well. In some examples, two or more of the herein-described optimization techniques can be used together; e.g., the fifth optimization technique can be combined with use of the first, second, third, and/or fourth optimization techniques.

FIG. 7 illustrates scenario 700 where computing device 102 determines optimized source 730 associated with hybrid synchronous/asynchronous deoptimization, in accordance with an example embodiment. During scenario 700, computing device 102 executes a JIT compiler to generate machine-language instructions from bytecodes corresponding to source 710. In other scenarios, a compiler other than a JIT compiler can be used.

Then, the JIT compiler modifies bytecodes corresponding to source 710 and/or adds bytecodes to generate modified bytecodes represented as optimized source 730, where optimized source 730 also represents modified source 720 that has been optimized using the fifth optimization technique. The JIT compiler generates machine-language instructions from the modified bytecodes. In other scenarios, the JIT compiler can output additional and/or modified machine-language instructions that correspond to modifying source 710 and/or modified source 720 into optimized source 730, rather than modifying and/or adding bytecodes.

After the JIT compiler generates at least some of the machine-language instructions for optimized source 730, computing device 102 uses runtime system software, which includes a bytecode interpreter for executing bytecodes, to execute bytecodes and/or machine-language instructions. In particular, computing device 102 executes the bytecodes and machine-language instructions representing optimized source 730 during scenario 700. After computing device 102 uses the runtime system software to execute the bytecodes and/or machine-language instructions corresponding to optimized source 730, scenario 700 can end.

Tables 9A, 9B, and 9C respectively reproduce herein reformatted contents of source 710, modified source 720, and optimized source 730 shown in FIG. 7.

TABLE 9A

```
class A {
    int X = 0;
    public void setX(int inX){ X = inX; };
    public int getX( ) { return(X); };
...}
class AHolder {
    A localA;
    public A getA( ) { return(localA); };
...}
```

TABLE 9A-continued

```
main(...) {
    Aholder h1, h2;
    int i;
    ...
    A receiver1 = h1.getA( );
    A receiver2 = h2.getA( );
    ...
    // begin NS portion P1
    i = 111;
    receiver1.setX(i);
    i = 222;
    receiver2.setX(i);
    ...
    // end NS portion P1
    ...
} // end main
```

TABLE 9B

```
main(...){
    Aholder h1, h2;
    int i;
    ...
    A receiver1 = h1.getA( );
    A receiver2 = h2.getA( );
    ...
    // begin NS portion P1
    i = 111;
    // L1: guard for 1st setX( )
    L1: if (ShouldDeoptA) { deopt( ); }
    // L2: devirtualized call
    L2: devirtualized call receiver1.setX(i);
    i = 222;
    // L3: guard for 2nd setX( )
    L3: if (ShouldDeoptA) { deopt( ); }
    devirtualized call receiver2.setX(i);
    ...
    // end NS portion P1
    ...
} // end main
```

TABLE 9C

```
main(...){
    Aholder h1, h2;
    int i;
    ...
    A receiver1 = h1.getA( );
    A receiver2 = h2.getA( );
    ...
    // begin NS portion P1
    i = 111;
    // L1: guard for 1st setX( )
    L1: if (ShouldDeoptA) { deopt( );}
    // L2: devirtualized call
    L2: devirtualized call receiver1.setX(i);
    i = 222;
    // since no thread susp.
    // between L2 and L3,
    // can delete guard at L3
    devirtualized call receiver2.setX(i);
    ...
    // end NS portion P1
    ...
} // end main
```

As shown in FIG. 7 and Table 9A, source 710 shows that "class A" includes at least one integer variable—"X"—and at least two methods: "setX(int inX)", which assigns the value of the X integer variable to a value of an input parameter "inX", and "getX( )", which returns the value of the X integer variable. Source 710 also includes definition of a "class AHolder" that includes at least an object of class A in a "localA" variable, where the localA variable can be obtained using the "getA( )" method of the AHolder class.

In scenario 700, the call to the getA( ) method in the line "A receiver1=h1.getA( )" leads to class hierarchy analysis for devirtualizing method calls made using a first receiver object "receiver1", as the getA( ) method could be returning either an object of class A or an object of a subclass of class A. A class hierarchy analysis can determine the actual type of the receiver1 object of source 710, corresponding method implementations, and possible devirtualization of method calls. Source 710 also shows a second receiver object "receiver2" being assigned to the result of a "h2.getA( )" method call and subsequent calls to the setX( ) method of class A via each of the receiver1 and receiver2 objects. These method calls can be checked for execution as virtual method calls using deoptimization indicators. In some embodiments, a method call executed as a virtual method call can be executed by the bytecode interpreter of the runtime system of computing device 102.

FIG. 7 and Table 9B show modified source 720 as source 710 after being updated for performing a hybrid synchronous/asynchronous deoptimization technique. In scenario 700, a class hierarchy analysis is performed for class A as part of execution of the line "A receiver=h1.getA( )" as discussed above. The class hierarchy analysis leads to the use of a should_deoptimize variable for guards related to the class A.

In modified source 720, a guard for checking a deoptimization indicator represented as a should_deoptimize variable is inserted prior to setX( ) and getX( ) method calls for class A mentioned above. In particular, modified source 720 includes a "ShouldDeoptA" variable for a deoptimization indicator for the class A used prior to the setX( ) method calls. If checking of a should_deoptimize variable for a method call indicates that deoptimization is to occur, software for asynchronous deoptimization, shown as a "deopt( )" function call in modified source 720, can be used to deoptimize the method call. If the method call is not deoptimized, then a devirtualized method call is performed as indicated by modified source 720. For example, modified source 720 shows that after the "guard for 1st setX( )" that a "devirtualized call" to "receiver1.setX(i)" is performed, which can be a devirtualized call to the setX( ) method of class A.

In scenario 700, execution of the receiver1.setX(i) and receiver2.setX(i) occurs within portion P1, which is a portion of software where thread suspension does not occur. For scenario 700, this portion of software begins where a comment "//begin NS portion P1" is located in each of source 710, modified source 720, and optimized source 730 and ends where a comment "//end NS portion P1" is located in each of source 710, modified source 720 and optimized source 730. Within these comments, "NS" is short for "no suspension".

Within portion P1, three labels are used to locate specific lines of software in FIG. 7 and Table 9B. In particular, modified source 720 includes three labels "L1", "L2", and "L3" to illustrate respective lines of software for: (1) a guard checking the should_deoptimize variable "ShouldDeoptA", (2) a devirtualized call that may be executed after the guard at label L1 to "receiver1.setX(i)", and (3) a guard checking the should_deoptimize variable "ShouldDeoptA" prior to a method call of "receiver2.setX(i)". Modified source 720 also indicates that all three labels L1, L2, and L3 along with their corresponding lines of code are within portion P1. In other scenarios, labels can be absent from portions of software where thread suspension does not occur.

FIG. 7 and Table 9C show optimized source 730, which is modified source 720 after being further modified (optimized) using the fifth optimization technique to reduce the number of guards in modified source 720. In portion P1, the guard at label L1 and the guard at label L3 each check the should_deoptimize variable ShouldDeoptA, and the guard at label L1 precedes the guard at label L3. Since the guard at label L1 precedes the guard at label L3 and thread suspension will not occur between labels L1 and L3, the guard at L3 can be eliminated from optimized source 730 as redundant according to the fifth optimization technique. Thus, the guard at label L3 in modified source 720 has been eliminated from optimized source 730.

Example Data Network

Figure 8:
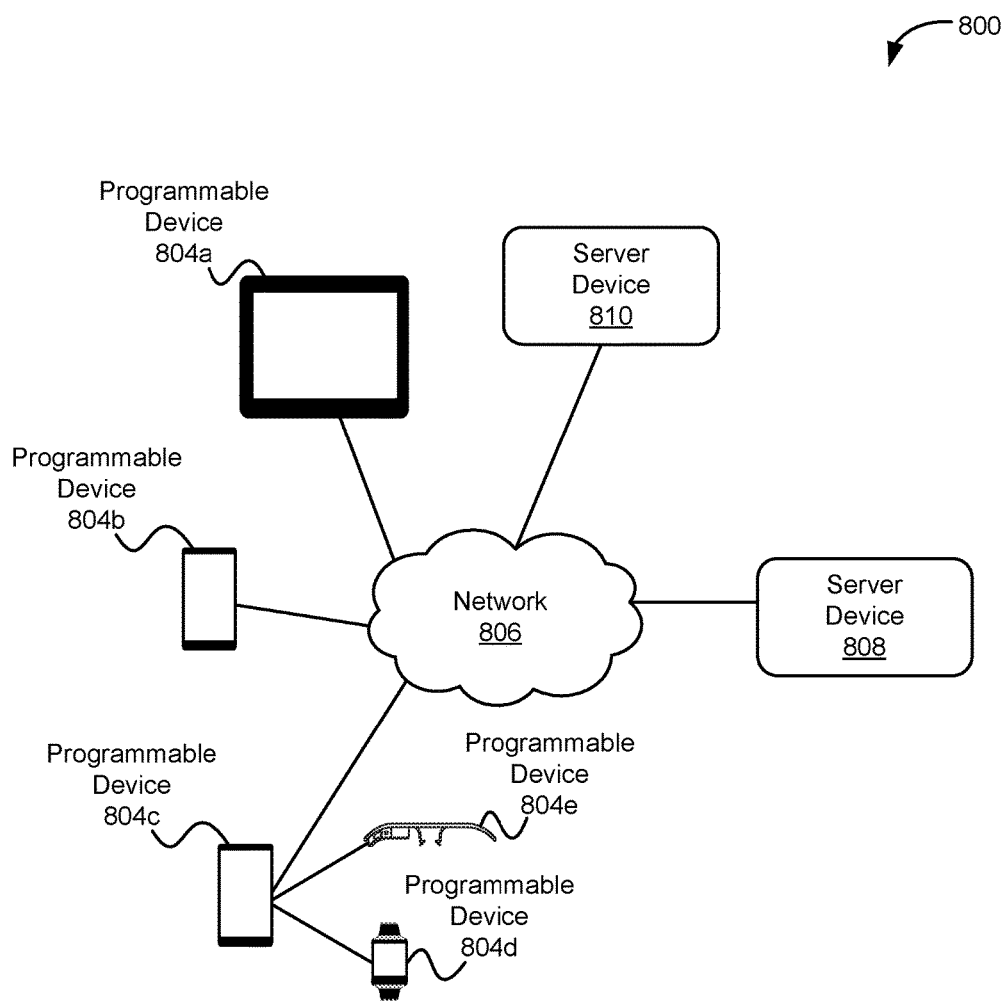
FIG. 8 depicts a distributed computing architecture, in accordance with an example embodiment.

FIG. 8 depicts a distributed computing architecture 800 with server devices 808, 810 configured to communicate, via network 806, with programmable devices 804a, 804b, 804c, 804d, 804e, in accordance with an example embodiment. Network 806 may correspond to a LAN, a wide area network (WAN), a corporate intranet, the public Internet, or any other type of network configured to provide a communications path between networked computing devices. Network 806 may also correspond to a combination of one or more LANs, WANs, corporate intranets, and/or the public Internet.

Although FIG. 8 only shows three programmable devices, distributed application architectures may serve tens, hundreds, or thousands of programmable devices. Moreover, programmable devices 804a, 804b, 804c, 804d, 804e (or any additional programmable devices) may be any sort of computing device, such as an ordinary laptop computer, desktop computer, wearable computing device, mobile computing device, head-mountable device (HMD), network terminal, wireless communication device (e.g., a smart phone or cell phone), and so on. In some embodiments, such as indicated with programmable devices 804a, 804b, 804c, programmable devices can be directly connected to network 806. In other embodiments, such as indicated with programmable devices 804d and 804e, programmable devices can be indirectly connected to network 806 via an associated computing device, such as programmable device 804c. In this example, programmable device 804c can act as an associated computing device to pass electronic communications between programmable devices 804d and 804e and network 806. In still other embodiments not shown in FIG. 8, a programmable device can be both directly and indirectly connected to network 806.

Server devices 808, 810 can be configured to perform one or more services, as requested by programmable devices 804a-804e. For example, server device 808 and/or 810 can provide content to programmable devices 804a-804e. The content can include, but is not limited to, web pages, hypertext, scripts, binary data such as compiled software, images, audio, and/or video. The content can include compressed and/or uncompressed content. The content can be encrypted and/or unencrypted. Other types of content are possible as well.

As another example, server device 808 and/or 810 can provide programmable devices 804a-804e with access to software for database, search, computation, graphical, audio, video, World Wide Web/Internet utilization, and/or other functions. Many other examples of server devices are possible as well.

Computing Device Architecture

Figure 9A:
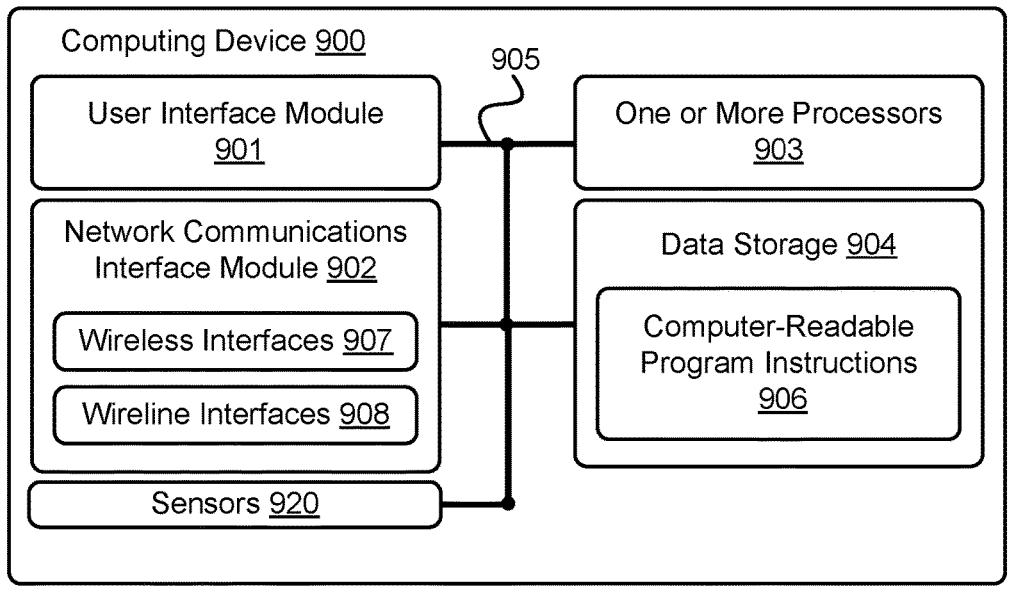
FIG. 9A is a functional block diagram of an example computing device, in accordance with an example embodiment.

FIG. 9A is a functional block diagram of computing device 900, in accordance with an example embodiment. In particular, computing device 900 shown in FIG. 9A can be configured to perform at least one function of a compiler, a JIT compiler, a AOT compiler, a runtime system, computing device 102, programmable devices 704a, 704b, 704c, 704d, 704e, server devices 708, 710, and/or at least one function related to hybrid synchronous/asynchronous deoptimization, an optimization technique, scenarios 100, 200, 300, 400, 500, 600, 700 and method 1000.

Computing device 900 may include a user interface module 901, a network-communication interface module 902, one or more processors 903, data storage 904, and one or more sensors 920, all of which may be linked together via a system bus, network, or other connection mechanism 905.

User interface module 901 can be operable to send data to and/or receive data from external user input/output devices. For example, user interface module 901 can be configured to send and/or receive data to and/or from user input devices such as a keyboard, a keypad, a touch screen, a computer mouse, a track ball, a joystick, a camera, a voice recognition module, and/or other similar devices. User interface module 901 can also be configured to provide output to user display devices, such as one or more cathode ray tubes (CRT), liquid crystal displays, light emitting diodes (LEDs), displays using digital light processing (DLP) technology, printers, light bulbs, and/or other similar devices, either now known or later developed. User interface module 901 can also be configured to generate audible output(s), such as a speaker, speaker jack, audio output port, audio output device, earphones, and/or other similar devices.

Network-communications interface module 902 can include one or more wireless interfaces 907 and/or one or more wireline interfaces 908 that are configurable to communicate via a network. Wireless interfaces 907 can include one or more wireless transmitters, receivers, and/or transceivers, such as a Bluetooth transceiver, a Zigbee transceiver, a Wi-Fi transceiver, a WiMAX transceiver, and/or other similar type of wireless transceiver configurable to communicate via a wireless network. Wireline interfaces 908 can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some embodiments, network communications interface module 902 can be configured to provide reliable, secured, and/or authenticated communications. For each communication, information for ensuring reliable communications (i.e., guaranteed message delivery) can be provided, perhaps as part of a message header and/or footer (e.g., packet/message sequencing information, encapsulation header(s) and/or footer(s), size/time information, and transmission verification information such as CRC and/or parity check values). Communications can be made secure (e.g., be encoded or encrypted) and/or decrypted/decoded using one or more cryptographic protocols and/or algorithms, such as, but not limited to, DES, AES, RSA, Diffie-Hellman, and/or DSA. Other cryptographic protocols and/or algorithms can be used as well or in addition to those listed herein to secure (and then decrypt/decode) communications.

One or more processors 903 can include one or more general purpose processors, and/or one or more special purpose processors (e.g., digital signal processors, graphics processing units, application specific integrated circuits, etc.). One or more processors 903 can be configured to execute computer-readable program instructions 906 that are contained in data storage 904 and/or other instructions as described herein.

Data storage 904 can include one or more computer-readable storage media that can be read and/or accessed by at least one of one or more processors 903. The one or more computer-readable storage media can include volatile and/or non-volatile storage components, such as optical, magnetic, organic or other memory or disc storage, which can be integrated in whole or in part with at least one of one or more processors 903. In some embodiments, data storage 904 can be implemented using a single physical device (e.g., one optical, magnetic, organic or other memory or disc storage unit), while in other embodiments, data storage 904 can be implemented using two or more physical devices.

Data storage 904 can include computer-readable program instructions 906 and perhaps additional data. In some embodiments, data storage 904 can additionally include storage required to perform at least part of the herein-described methods, scenarios, and techniques and/or at least part of the functionality of the herein-described devices and networks.

In some embodiments, computing device 900 can include one or more sensors 920. Sensor(s) 920 can be configured to measure conditions in an environment of computing device 900 and provide data about that environment. For example, sensor(s) 920 can include one or more of: (i) an identification sensor to identify other objects and/or devices, such as, but not limited to, an RFID reader, proximity sensor, one-dimensional barcode reader, two-dimensional barcode (e.g., Quick Response (QR) code) reader, and a laser tracker, where the identification sensor(s) can be configured to read identifiers, such as RFID tags, barcodes, QR codes, and/or other devices and/or object configured to be read and provide at least identifying information; (ii) a location sensor to measure locations and/or movements of computing device 900, such as, but not limited to, a gyroscope, an accelerometer, a Doppler sensor, a Global Positioning System (GPS) device, a sonar sensor, a radar device, a laser-displacement sensor, and a compass; (iii) an environmental sensor to obtain data indicative of an environment of computing device 900, such as, but not limited to, an infrared sensor, an optical sensor, a light sensor, a camera, a biosensor, a capacitive sensor, a touch sensor, a temperature sensor, a wireless sensor, a radio sensor, a movement sensor, a microphone, a sound sensor, an ultrasound sensor, and/or a smoke sensor; and (iv) a force sensor to measure one or more forces (e.g., inertial forces and/or G-forces) acting about computing device 900, such as, but not limited to one or more sensors that measure: forces in one or more dimensions, torque, ground force, friction, and/or a zero moment point (ZMP) sensor that identifies ZMPs and/or locations of the ZMPs. Many other examples of sensor(s) 920 are possible as well.

Cloud-Based Servers

Figure 9B:
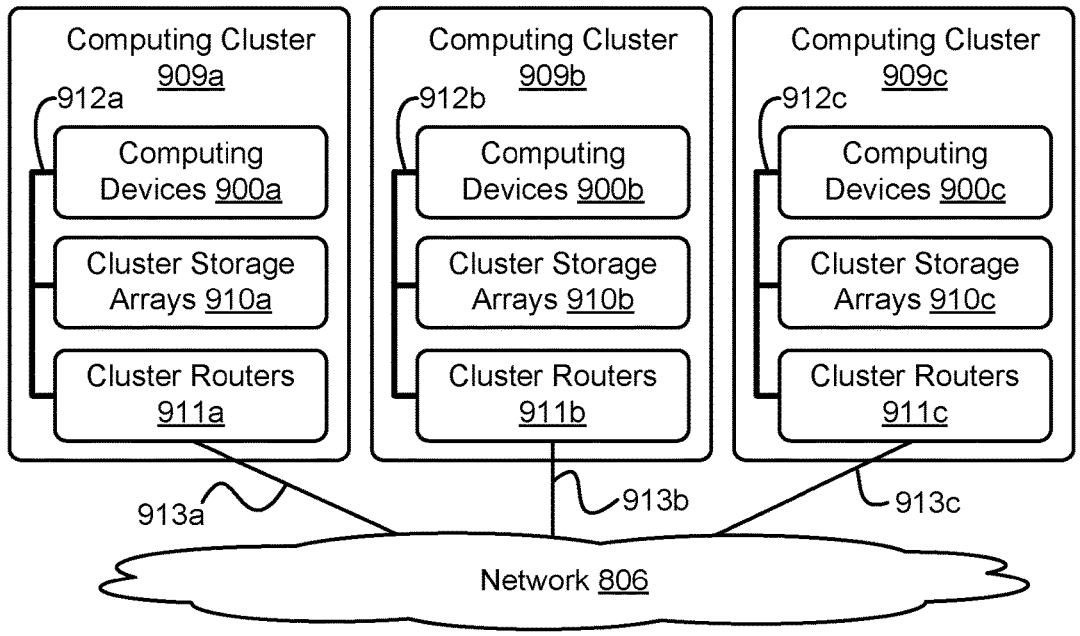
FIG. 9B depicts a network of computing clusters arranged as a cloud-based server system, in accordance with an example embodiment.

FIG. 9B depicts a network 914 of computing clusters 909a, 909b, 909c arranged as a cloud-based server system in accordance with an example embodiment. Computing clusters 909a, 909b, 909c can be cloud-based devices that store program logic and/or data of cloud-based applications and/or services; e.g., perform at least one function of a compiler, a JIT compiler, a AOT compiler, a runtime system, computing device 102, network 806, and/or at least one function related to hybrid synchronous/asynchronous deoptimization, an optimization technique, scenarios 100, 200, 300, 400, 500, 600, 700 and method 1000.

In some embodiments, computing clusters 909a, 909b, 909c can be a single computing device residing in a single computing center. In other embodiments, computing clusters 909a, 909b, 909c can include multiple computing devices in a single computing center, or even multiple computing devices located in multiple computing centers located in diverse geographic locations. For example, FIG. 9B depicts each of computing clusters 909a, 909b, and 909c residing in different physical locations.

In some embodiments, data and services at computing clusters 909a, 909b, 909c can be encoded as computer readable information stored in non-transitory, tangible computer readable media (or computer readable storage media) and accessible by other computing devices. In some embodiments, computing clusters 909a, 909b, 909c can be stored on a single disk drive or other tangible storage media, or can be implemented on multiple disk drives or other tangible storage media located at one or more diverse geographic locations.

FIG. 9B depicts a cloud-based server system in accordance with an example embodiment. In FIG. 9B, functionality of a compiler, a JIT compiler, an AOT compiler, a runtime system, and/or a computing device can be distributed among computing clusters 909a, 909b, 909c. Computing cluster 909a can include one or more computing devices 900a, cluster storage arrays 910a, and cluster routers 911a connected by a local cluster network 912a. Similarly, computing cluster 909b can include one or more computing devices 900b, cluster storage arrays 910b, and cluster routers 911b connected by a local cluster network 912b. Likewise, computing cluster 909c can include one or more computing devices 900c, cluster storage arrays 910c, and cluster routers 911c connected by a local cluster network 912c.

In some embodiments, each of computing clusters 909a, 909b, and 909c can have an equal number of computing devices, an equal number of cluster storage arrays, and an equal number of cluster routers. In other embodiments, however, each computing cluster can have different numbers of computing devices, different numbers of cluster storage arrays, and different numbers of cluster routers. The number of computing devices, cluster storage arrays, and cluster routers in each computing cluster can depend on the computing task or tasks assigned to each computing cluster.

In computing cluster 909a, for example, computing devices 900a can be configured to perform various computing tasks of a compiler, a JIT compiler, an AOT compiler, a runtime system, and/or a computing device. In one embodiment, the various functionalities of a compiler, a JIT compiler, an AOT compiler, a runtime system, and/or a computing device can be distributed among one or more of computing devices 900a, 900b, 900c. Computing devices 900b and 900c in respective computing clusters 909b and 909c can be configured similarly to computing devices 900a in computing cluster 909a. On the other hand, in some embodiments, computing devices 900a, 900b, and 900c can be configured to perform different functions.

In some embodiments, computing tasks and stored data associated with a compiler, a JIT compiler, a AOT compiler, a runtime system, and/or a computing device can be distributed across computing devices 900a, 900b, and 900c based at least in part on the processing requirements of a compiler, a JIT compiler, a AOT compiler, a runtime system, and/or a computing device, the processing capabilities of computing devices 900a, 900b, 900c, the latency of the network links between the computing devices in each computing cluster and between the computing clusters themselves, and/or other factors that can contribute to the cost, speed, fault-tolerance, resiliency, efficiency, and/or other design goals of the overall system architecture.

Cluster storage arrays 910a, 910b, 910c of computing clusters 909a, 909b, 909c can be data storage arrays that include disk array controllers configured to manage read and write access to groups of hard disk drives. The disk array controllers, alone or in conjunction with their respective computing devices, can also be configured to manage backup or redundant copies of the data stored in the cluster storage arrays to protect against disk drive or other cluster storage array failures and/or network failures that prevent one or more computing devices from accessing one or more cluster storage arrays.

Similar to the manner in which the functions of a compiler, a JIT compiler, a AOT compiler, a runtime system, and/or a computing device can be distributed across computing devices 900a, 900b, 900c of computing clusters 909a, 909b, 909c, various active portions and/or backup portions of these components can be distributed across cluster storage arrays 910a, 910b, 910c. For example, some cluster storage arrays can be configured to store one portion of the data of a compiler, a JIT compiler, a AOT compiler, a runtime system, and/or a computing device can, while other cluster storage arrays can store other portion(s) of data of a compiler, a JIT compiler, a AOT compiler, a runtime system, and/or a computing device. Additionally, some cluster storage arrays can be configured to store backup versions of data stored in other cluster storage arrays.

Cluster routers 911a, 911b, 911c in computing clusters 909a, 909b, 909c can include networking equipment configured to provide internal and external communications for the computing clusters. For example, cluster routers 911a in computing cluster 909a can include one or more internet switching and routing devices configured to provide (i) local area network communications between computing devices 900a and cluster storage arrays 910a via local cluster network 912a, and (ii) wide area network communications between computing cluster 909a and computing clusters 909b and 909c via wide area network connection 913a to network 806. Cluster routers 911b and 911c can include network equipment similar to cluster routers 911a, and cluster routers 911b and 911c can perform similar networking functions for computing clusters 909b and 909b that cluster routers 911a perform for computing cluster 909a.

In some embodiments, the configuration of cluster routers 911a, 911b, 911c can be based at least in part on the data communication requirements of the computing devices and cluster storage arrays, the data communications capabilities of the network equipment in cluster routers 911a, 911b, 911c, the latency and throughput of local networks 912a, 912b, 912c, the latency, throughput, and cost of wide area network links 913a, 913b, 913c, and/or other factors that can contribute to the cost, speed, fault-tolerance, resiliency, efficiency and/or other design criteria of the moderation system architecture.

Example Methods of Operation

Figure 10:
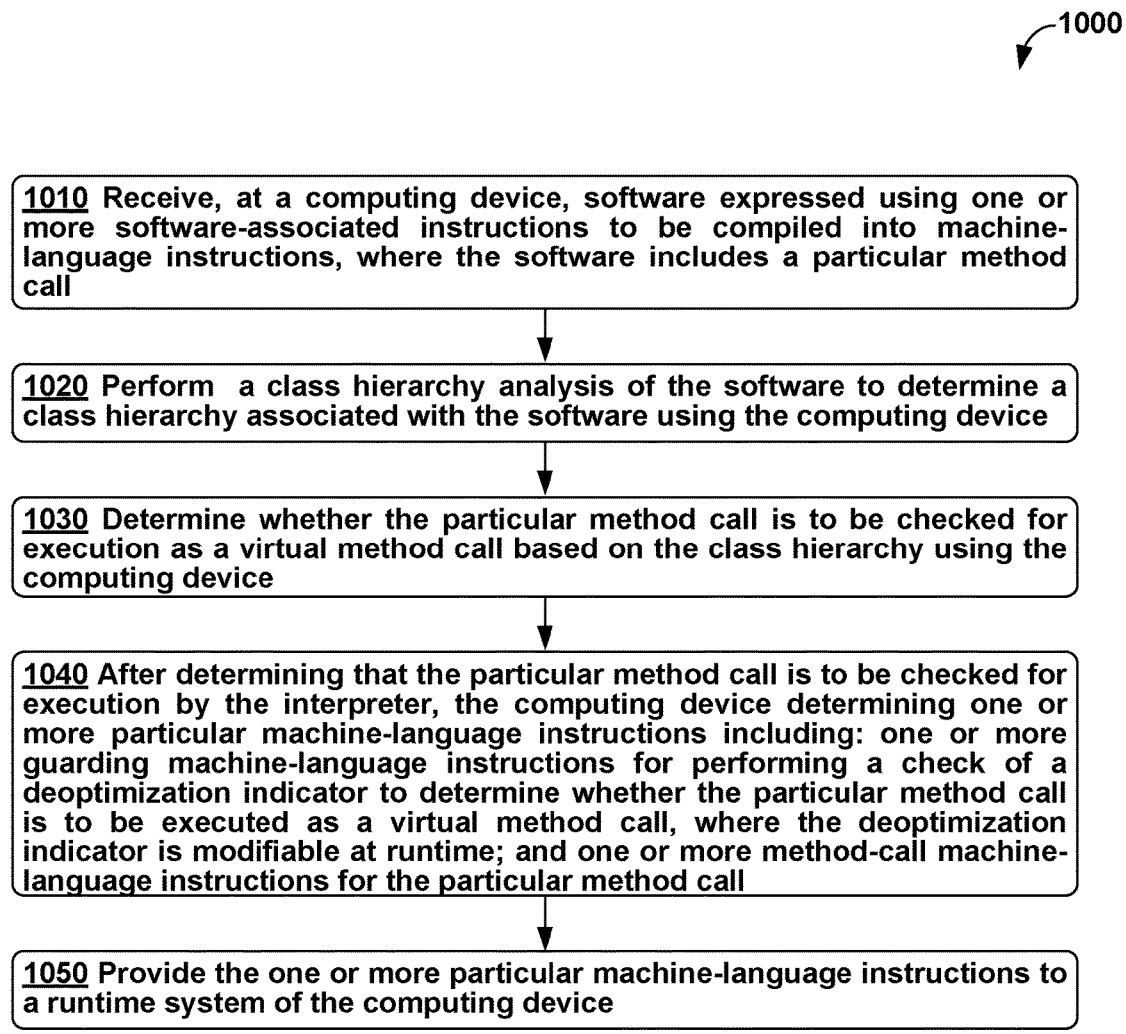
FIG. 10 is a flowchart of a method, in accordance with an example embodiment.

FIG. 10 is a flowchart of method 1000, in accordance with an example embodiment. Method 1000 can be executed by a computing device, such as computing device 900. Method 1000 can begin at block 1010, where a computing device can receive software expressed using one or more software-associated instructions to be compiled into machine-language instructions, and where the software includes a particular method call, such as discussed above at least in the context of FIGS. 1-7.

In some embodiments, the one or more software-associated instructions can include one or more bytecodes that are not directly executable by the computing device, where the computing device includes an interpreter for executing uncompiled software-associated instructions, where the interpreter can include software for executing the one or more bytecodes using the computing device, and where the one or more machine-language instructions can be directly executable by the computing device without use of the interpreter, such as discussed above at least in the context of FIGS. 1-7.

At block 1020, the computing device can perform a class hierarchy analysis of the software to determine a class hierarchy associated with the software, such as discussed above at least in the context of FIGS. 1-7.

At block 1030, the computing device can determine whether the particular method call is to be checked for execution as a virtual method call based on the class hierarchy, such as discussed above at least in the context of FIGS. 1-7. In some embodiments, determining whether the particular method call is to be checked for execution as a virtual method call based on the class hierarchy can include determining whether the particular method call is eligible for being performed as a direct method call based on the class hierarchy, such as discussed above at least in the context of FIGS. 1-7. In particular of these embodiments, the particular method call can be associated with a particular method, where the software can be associated with a virtual method table (vtable), the vtable can include a particular entry having an identifier for the particular method and a reference to the particular method, and where a direct method call of the particular method can avoid use of the vtable, such as discussed above.

In other embodiments, the particular method call can be associated with a particular method. Then, determining whether the particular method call is to be checked for execution as a virtual method call based on the class hierarchy can include: determining whether there is one implementation for the particular method using the class hierarchy; and after determining that there is one implementation for the particular method, determining that the particular method call is to be checked for execution as a virtual method call, such as discussed above at least in the context of FIGS. 1-7.

In still other embodiments, the computing device includes an interpreter for executing uncompiled software-associated instructions. Then, wherein determining whether the particular method call is be executed as a virtual method call comprises determining whether the particular method call is to be executed by the interpreter, such as discussed above at least in the context of FIGS. 1-7.

At block 1040, the computing device can, after determining that the particular method call is to be checked for execution as a virtual method call, determine one or more particular machine-language instructions. The one or more particular machine-language instructions can include: one or more guarding machine-language instructions for performing a check of a deoptimization indicator to determine whether the particular method call is to be executed as a virtual method call, where the deoptimization indicator is modifiable at runtime; and one or more method-call machine-language instructions for the particular method call, such as discussed above at least in the context of FIGS. 1-7.

At block 1050, the computing device can provide the one or more particular machine-language instructions to a runtime system of the computing device, such as discussed above at least in the context of FIGS. 1 and 2.

In some embodiments, method 1000 can also include: loading additional software into the runtime system during runtime; and determining an updated class hierarchy analysis by updating the class hierarchy analysis of the software to account for the additional software, such as discussed above at least in the context of FIGS. 2A and 2B.

In particular of these embodiments, the deoptimization indicator can be initialized to a value associated with allowing optimization. Then, method 1000 can also include: after loading the additional software into the runtime system, setting the value of the deoptimization indicator during runtime to a value associated with denying optimization based on the updated class hierarchy analysis, such as discussed above at least in the context of FIGS. 2A and 2B.

In more particular of these embodiments, the one or more method-call machine-language instructions for the particular method call can include one or more machine-language instructions for a direct method call. Then, method 1000 can also include: prior to loading the additional software, executing the one or more guarding machine-language instructions for performing the check of the deoptimization indicator to determine whether the particular method call is to be executed as a virtual method call using the runtime system; determining to execute the one or more machine-language instructions for a direct method call based on the deoptimization indicator having the value associated with allowing optimization; after updating the class hierarchy analysis, executing the one or more guarding machine-language instructions for performing the check of the deoptimization indicator to determine whether the particular method call is to be executed as a virtual method call using the runtime system; and determining to execute the particular method call as a virtual method call based on the deoptimization indicator having the value associated with denying optimization, such as discussed above at least in the context of FIGS. 2A and 2B.

In other embodiments, method 1000 can also include: performing the particular method call by using the runtime system of the computing device to execute the one or more particular machine-language instructions, such as discussed above at least in the context of FIGS. 1, 2A, and 2B. In particular of these embodiments, using the runtime system of the computing device to execute the one or more machine-language instructions can include: executing the one or more guarding machine-language instructions to perform the check whether the particular method call is to be executed as a virtual method call; determining that the particular method call is to be executed as a virtual method call based on the check; and executing the particular method call as a virtual method call, such as discussed above at least in the context of FIGS. 2A and 2B.

In other particular of these embodiments, using the runtime system of the computing device to execute the one or more particular machine-language instructions can include: executing the one or more guarding machine-language instructions to perform the check whether the particular method call is to be executed as a virtual method call; determining that the particular method call is not to be executed as a virtual method call based on the check; and using the runtime system to execute the one or more method-call machine-language instructions, such as discussed above at least in the context of FIGS. 1, 2A, and 2B.

In even other embodiments, the software can include a first method call associated with a first method and a second method call associated with a second method, where the first method call can be associated with a first deoptimization indicator for determining whether the first method call is to be executed as a virtual method call, where the second method call can be associated with a second deoptimization indicator for determining whether the second method call is to be executed as a virtual method call, and where the first and second deoptimization indicators can be modified at runtime, such as discussed above.

In particular of these embodiments, method 1000 can further include: initializing each of the first deoptimization indicator and the second deoptimization indicator to a value associated with allowing optimization at runtime; loading additional software into the runtime system during runtime; and after loading the additional software, updating the first and second deoptimization indicators to account for the additional software using the computing device, such as discussed above.

In more particular of these embodiments, the software can include a first implementation of the first method and a first implementation of the second method, where the additional software can include a second implementation of the first method. Then, updating the first and second deoptimization indicators to account for the additional software using the runtime system can include: determining whether the software and the additional software includes a plurality of implementations of the first method; and after determining that the software and the additional software include the first and second implementations of the first method, setting the value of the first deoptimization indicator to a value associated with denying optimization, such as discussed above.

In other more particular of these embodiments, the software and the additional software can include only the first implementation of the second method. Then, updating the first and second deoptimization indicators to account for the additional software using the runtime system can include: determining whether the software and the additional software includes a plurality of implementations of the second method; and after determining that the software and the additional software includes only the first implementation of the second method, maintaining the value of the second deoptimization indicator to the value associated with allowing optimization, such as discussed above at least in the context of FIGS. 1, 2A, and 2B.

Additional Example Embodiments

The following clauses are offered as further description of the disclosure.

Clause 1—A method, including: receiving, at a computing device, software expressed using one or more software-associated instructions to be compiled into machine-language instructions, where the software includes a particular method call; performing a class hierarchy analysis of the software to determine a class hierarchy associated with the software using the computing device; determining whether the particular method call is to be checked for execution as a virtual method call based on the class hierarchy using the computing device; after determining that the particular method call is to be checked for execution as a virtual method call, the computing device determining one or more particular machine-language instructions including: one or more guarding machine-language instructions for performing a check of a deoptimization indicator to determine whether the particular method call is to be executed as a virtual method call, where the deoptimization indicator is modifiable at runtime; and one or more method-call machine-language instructions for the particular method call; and providing the one or more particular machine-language instructions to a runtime system of the computing device.

Clause 2—The method of Clause 1, further including: loading additional software into the runtime system during runtime; and determining an updated class hierarchy analysis by updating the class hierarchy analysis of the software to account for the additional software.

Clause 3—The method of Clause 2, where the deoptimization indicator is initialized to a value associated with allowing optimization, and where the method further includes: after loading the additional software into the runtime system, setting the value of the deoptimization indicator during runtime to a value associated with denying optimization based on the updated class hierarchy analysis.

Clause 4—The method of Clause 3, where the one or more method-call machine-language instructions for the particular method call include one or more machine-language instructions for a direct method call, and where the method further includes: prior to loading the additional software, executing the one or more guarding machine-language instructions for performing the check of the deoptimization indicator to determine whether the particular method call is to be executed as a virtual method call using the runtime system; determining to execute the one or more machine-language instructions for a direct method call based on the deoptimization indicator having the value associated with allowing optimization; after updating the class hierarchy analysis, executing the one or more guarding machine-language instructions for performing the check of the deoptimization indicator to determine whether the particular method call is to be executed as a virtual method call using the runtime system; and determining to execute the particular method call as a virtual method call based on the deoptimization indicator having the value associated with denying optimization.

Clause 5—The method of Clause 1, where determining whether the particular method call is to be checked for execution as a virtual method call based on the class hierarchy includes determining whether the particular method call is eligible for being performed as a direct method call based on the class hierarchy.

Clause 6—The method of Clause 5, where the particular method call is associated with a particular method, where the software is associated with a virtual method table (vtable), the vtable including a particular entry including an identifier for the particular method and a reference to the particular method, and where the direct method call of the particular method avoids use of the vtable.

Clause 7—The method of Clause 1, where the one or more software-associated instructions include one or more bytecodes that are not directly executable by the computing device, where the computing device includes an interpreter for executing uncompiled software-associated instructions, where the interpreter includes software for executing the one or more bytecodes using the computing device, and where the one or more machine-language instructions are directly executable by the computing device without use of the interpreter.

Clause 8—The method of Clause 1, further including: performing the particular method call by using the runtime system of the computing device to execute the one or more particular machine-language instructions.

Clause 9—The method of Clause 8, where using the runtime system of the computing device to execute the one or more machine-language instructions includes: executing the one or more guarding machine-language instructions to perform the check whether the particular method call is to be executed as a virtual method call; determining that the particular method call is to be executed as a virtual method call based on the check; and executing the particular method call as a virtual method call.

Clause 10—The method of Clause 8, where using the runtime system of the computing device to execute the one or more particular machine-language instructions includes: executing the one or more guarding machine-language instructions to perform the check whether the particular method call is to be executed as a virtual method call; determining that the particular method call is not to be executed as a virtual method call based on the check; and using the runtime system to execute the one or more method-call machine-language instructions.

Clause 11—The method of Clause 1, where the particular method call is associated with a particular method, and where determining whether the particular method call is to be checked for execution as a virtual method call based on the class hierarchy includes: determining whether there is one implementation for the particular method using the class hierarchy; and after determining that there is one implementation for the particular method, determining that the particular method call is to be checked for execution as a virtual method call.

Clause 12—The method of Clause 1, where the software includes a first method call associated with a first method and a second method call associated with a second method, where the first method call is associated with a first deoptimization indicator for determining whether the first method call is to be executed as a virtual method call, where the second method call is associated with a second deoptimization indicator for determining whether the second method call is to be executed as a virtual method call, and where the first and second deoptimization indicators are modifiable at runtime.

Clause 13—The method of Clause 12, further including: initializing each of the first deoptimization indicator and the second deoptimization indicator to a value associated with allowing optimization at runtime; loading additional software into the runtime system during runtime; and after loading the additional software, updating the first and second deoptimization indicators to account for the additional software using the computing device.

Clause 14—The method of Clause 13, where the software includes a first implementation of the first method and a first implementation of the second method, where the additional software includes a second implementation of the first method, and where updating the first and second deoptimization indicators to account for the additional software using the runtime system includes: determining whether the software and the additional software includes a plurality of implementations of the first method; and after determining that the software and the additional software include the first and second implementations of the first method, setting the value of the first deoptimization indicator to a value associated with denying optimization.

Clause 15—The method of Clause 13, where the software and the additional software include only the first implementation of the second method, and where updating the first and second deoptimization indicators to account for the additional software using the runtime system includes: determining whether the software and the additional software includes a plurality of implementations of the second method; and after determining that the software and the additional software includes only the first implementation of the second method, maintaining the value of the second deoptimization indicator to the value associated with allowing optimization.

Clause 16—The method of Clause 1, where the computing device includes an interpreter for executing uncompiled software-associated instructions, and where determining whether the particular method call is be executed as a virtual method call includes determining whether the particular method call is to be executed by the interpreter.

Clause 17—A computing device, including: one or more processors; and data storage including at least computer-executable instructions stored thereon that, when executed by the one or more processors, cause the computing device to perform functions including the method of any one of Clauses 1-16.

Clause 18—A non-transitory computer readable medium having stored thereon instructions, that when executed by one or more processors of a computing device, cause the computing device to perform functions including the method of any one of Clauses 1-16.

Clause 19—An apparatus, including: means for performing the method of any one of Clauses 1-16.

Clause 20—A system, including: a first computing device, including: one or more first processors; and first data storage including at least computer-executable instructions stored thereon that, when executed by the one or more first processors, cause the first computing device to perform first functions that include: sending first software expressed using one or more software-associated instructions; and the second computing device, including: one or more second processors; and second data storage including at least computer-executable instructions stored thereon that, when executed by the one or more second processors, cause the second computing device to perform second functions including the method of any one of Clauses 1-16, where the software expressed using one or more software-associated instructions to be compiled into machine-language instructions includes the first software.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as non-transitory computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for provided for explanatory purposes and are not intended to be limiting, with the true scope being indicated by the following claims.

What is claimed is:

1. A method, comprising:
receiving, at a computing device, software expressed using one or more software-associated instructions to be compiled into machine-language instructions, wherein the software comprises a particular method call associated with a particular class;
performing a class hierarchy analysis of the software to determine a class hierarchy associated with the software using the computing device, wherein the class hierarchy analysis indicates use of a particular deoptimization indicator for the particular method call, and wherein the particular deoptimization indicator is modifiable at runtime;
during execution of the software, using dynamic class loading to load additional software into a runtime system of the computing device so that the runtime system is loaded with both the software and the additional software, wherein the additional software includes additional software for the particular class;
after loading the additional software, updating the class hierarchy analysis to determine an updated class hierarchy associated with both the software and the additional software, wherein the updated class hierarchy analysis leads to determining whether to update the particular deoptimization indicator for the particular method call based on the additional software for the particular class;

determining whether the particular method call is to be checked for execution as a virtual method call based on the updated class hierarchy using the computing device;

after determining that the particular method call is to be checked for execution as a virtual method call, the computing device determining one or more particular machine-language instructions comprising:

one or more guarding machine-language instructions for performing a check of the particular deoptimization indicator to determine whether the particular method call is to be executed as a virtual method call; and one or more method-call machine-language instructions for the particular method call; and providing the one or more particular machine-language instructions to the runtime system of the computing device.

2. The method of claim 1, wherein the computing device comprises one or more registers, wherein the particular deoptimization indicator is stored in a particular register of the one or more registers, and wherein the one or more guarding machine-language instructions comprises a test-and-branch operation for the particular register.

3. The method of claim 1, wherein the particular deoptimization indicator is initialized to a value associated with allowing optimization, and wherein updating the class hierarchy analysis to determine the updated class hierarchy further comprises:

after loading the additional software into the runtime system, setting the value of the particular deoptimization indicator during runtime to a value associated with denying optimization based on the updated class hierarchy.

4. The method of claim 3, wherein the one or more method-call machine-language instructions for the particular method call comprise one or more machine-language instructions for a direct method call, and wherein the method further comprises:

prior to loading the additional software, executing the one or more guarding machine-language instructions for performing the check of the particular deoptimization indicator to determine whether the particular method call is to be executed as a virtual method call using the runtime system;

determining to execute the one or more machine-language instructions for a direct method call based on the particular deoptimization indicator having the value associated with allowing optimization;

after updating the class hierarchy analysis, executing the one or more guarding machine-language instructions for performing the check of the particular deoptimization indicator to determine whether the particular method call is to be executed as a virtual method call using the runtime system; and determining to execute the particular method call as a virtual method call based on the particular deoptimization indicator having the value associated with denying optimization.

5. The method of claim 1, wherein determining whether the particular method call is to be checked for execution as a virtual method call based on the updated class hierarchy comprises determining whether the particular method call is eligible for being performed as a direct method call based on the updated class hierarchy.

6. The method of claim 5, wherein the particular method call is associated with a particular method, wherein the software is associated with a virtual method table (vtable), the vtable comprising a particular entry comprising an identifier for the particular method and a reference to the particular method, and wherein the direct method call of the particular method avoids use of the vtable.

7. The method of claim 1, wherein the one or more software-associated instructions comprise one or more bytecodes that are not directly executable by the computing device, wherein the computing device comprises an interpreter for executing uncompiled software-associated instructions, wherein the interpreter comprises software for executing the one or more bytecodes using the computing device, and wherein the one or more machine-language instructions are directly executable by the computing device without use of the interpreter.

8. The method of claim 1, further comprising:

performing the particular method call by using the runtime system of the computing device to execute the one or more particular machine-language instructions.

9. The method of claim 8, wherein using the runtime system of the computing device to execute the one or more machine-language instructions comprises:

executing the one or more guarding machine-language instructions to perform the check whether the particular method call is to be executed as a virtual method call;

determining that the particular method call is to be executed as a virtual method call based on the check; and executing the particular method call as a virtual method call.

10. The method of claim 8, wherein using the runtime system of the computing device to execute the one or more particular machine-language instructions comprises:

executing the one or more guarding machine-language instructions to perform the check whether the particular method call is to be executed as a virtual method call;

determining that the particular method call is not to be executed as a virtual method call based on the check; and using the runtime system to execute the one or more method-call machine-language instructions.

11. The method of claim 1, wherein the particular method call is associated with a particular method, and wherein determining whether the particular method call is to be checked for execution as a virtual method call based on the updated class hierarchy comprises:

determining whether there is one implementation for the particular method using the updated class hierarchy; and after determining that there is one implementation for the particular method, determining that the particular method call is to be checked for execution as a virtual method call.

12. The method of claim 1, wherein the software comprises a first method call associated with a first method and a second method call associated with a second method, wherein the first method call is associated with a first deoptimization indicator for determining whether the first method call is to be executed as a virtual method call, wherein the second method call is associated with a second deoptimization indicator for determining whether the second method call is to be executed as a virtual method call, and wherein the first and second deoptimization indicators are modifiable at runtime.

13. The method of claim 12, further comprising:
initializing each of the first deoptimization indicator and the second deoptimization indicator to a value associated with allowing optimization at runtime;
and wherein updating the class hierarchy analysis to determine the updated class hierarchy further comprises:
updating the first and second deoptimization indicators to account for the additional software using the computing device.

14. The method of claim 13, wherein the software comprises a first implementation of the first method and a first implementation of the second method, wherein the additional software comprises a second implementation of the first method, and wherein updating the first and second deoptimization indicators to account for the additional software using the runtime system comprises:
determining whether the software and the additional software comprises a plurality of implementations of the first method; and
after determining that the software and the additional software comprise the first and second implementations of the first method, setting the value of the first deoptimization indicator to a value associated with denying optimization.

15. The method of claim 14, wherein the software and the additional software include only the first implementation of the second method, and wherein updating the first and second deoptimization indicators to account for the additional software using the runtime system comprises:
determining whether the software and the additional software comprises a plurality of implementations of the second method; and
after determining that the software and the additional software comprises only the first implementation of the second method, maintaining the value of the second deoptimization indicator to the value associated with allowing optimization.

16. The method of claim 1, wherein the computing device comprises an interpreter for executing uncompiled software-associated instructions, and wherein determining whether the particular method call is be executed as a virtual method call comprises determining whether the particular method call is to be executed by the interpreter.

17. The method of claim 1, wherein determining whether the particular method call is to be checked for execution as a virtual method call based on the updated class hierarchy comprises:
determining whether the particular method call is in a portion of the software where thread suspension does not occur;
after determining that the particular method call is in a portion of the software where thread suspension does not occur, determining whether a previous check for execution as a virtual method call has been performed in the portion of the software where thread suspension does not occur; and
after determining that the previous check for execution has been performed in the portion of the software where thread suspension does not occur, determining not to check the particular method call for execution as a virtual method call.

18. A computing device, comprising:
one or more processors; and
data storage including at least computer-executable instructions stored thereon that, when executed by the one or more processors, cause the computing device to perform functions comprising:
receiving software expressed using one or more software-associated instructions to be compiled into machine-language instructions, wherein the software comprises a particular method call associated with a particular class;
performing a class hierarchy analysis of the software to determine a class hierarchy associated with the software, wherein the class hierarchy analysis indicates use of a particular deoptimization indicator for the particular method call, and wherein the particular deoptimization indicator is modifiable at runtime;
during execution of the software, using dynamic class loading to load additional software into a runtime system so that the runtime system is loaded with both the software and the additional software, wherein the additional software includes additional software for the particular class;
after loading the additional software, updating the class hierarchy analysis to determine an updated class hierarchy associated with both the software and the additional software, wherein the updated class hierarchy analysis leads to determining whether to update the particular deoptimization indicator for the particular method call based on the additional software for the particular class;
determining whether the particular method call is to be checked for execution as a virtual method call based on the updated class hierarchy;
after determining that the particular method call is to be checked for execution as a virtual method call, determining one or more particular machine-language instructions comprising:
one or more guarding machine-language instructions for performing a check of the particular deoptimization indicator to determine whether the particular method call is to be executed as a virtual method call; and
one or more method-call machine-language instructions for the particular method call; and
providing the one or more particular machine-language instructions to the runtime system of the computing device.

19. The computing device of claim 18,
wherein the computing device further comprises one or more registers, wherein the particular deoptimization indicator is stored in a particular register of the one or more registers, and wherein the one or more guarding machine-language instructions comprises a test-and-branch operation for the particular register.

20. A non-transitory computer readable medium having stored thereon instructions, that when executed by one or more processors of a computing device, cause the computing device to perform functions comprising:
receiving software expressed using one or more software-associated instructions to be compiled into machine-language instructions, wherein the software comprises a particular method call associated with a particular class;
performing a class hierarchy analysis of the software to determine a class hierarchy associated with the software, wherein the class hierarchy analysis indicates use of a particular deoptimization indicator for the particular method call, and wherein the particular deoptimization indicator is modifiable at runtime;

during execution of the software, using dynamic class loading to load additional software into a runtime system so that the runtime system is loaded with both the software and the additional software, wherein the additional software includes additional software for the particular class;

after loading the additional software, updating the class hierarchy analysis to determine an updated class hierarchy associated with both the software and the additional software, wherein the updated class hierarchy analysis leads to determining whether to update the particular deoptimization indicator for the particular method call based on the additional software for the particular class;

determining whether the particular method call is to be checked for execution as a virtual method call based on the updated class hierarchy;

after determining that the particular method call is to be checked for execution as a virtual method call, determining one or more particular machine-language instructions comprising:

one or more guarding machine-language instructions for performing a check of the particular deoptimization indicator to determine whether the particular method call is to be executed as a virtual method call; and one or more method-call machine-language instructions for the particular method call; and providing the one or more particular machine-language instructions to the runtime system of the computing device.

* * * * *